US012752625B2

(12) United States Patent
Li et al.

(10) Patent No.: US 12,752,625 B2
(45) Date of Patent: Oct. 6, 2026

(54) DYNAMIC CAPTION GENERATION ON A VEHICLE DISPLAY UNIT

(71) Applicant: Adeia Guides Inc., San Jose, CA (US)

(72) Inventors: Zhiyun Li, Kenmore, WA (US); Ning Xu, Irvine, CA (US); Kyle Beckemeyer, Park Ridge, IL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 19/094,222

(22) Filed: Mar. 28, 2025

(65) Prior Publication Data

US 2026/0296192 A1 Oct. 1, 2026

(51) Int. Cl.
*G10L 15/16* (2006.01)
*B60K 35/235* (2024.01)
(Continued)

(52) U.S. Cl.
CPC ............ *B60K 35/28* (2024.01); *B60K 35/235* (2024.01); *G10L 15/16* (2013.01); *G10L 15/26* (2013.01);
(Continued)

(58) Field of Classification Search
CPC .................. B60K 35/08; B60K 35/235; B60K 2360/148; B60K 2360/161; G10L 15/16; G10L 15/26; G10L 21/0208
See application file for complete search history.

(56) References Cited

U.S. PATENT DOCUMENTS

| | | | |
|---|---|---|---|
| 8,504,351 | B2 | 8/2013 | Waibel et al. |
| 9,280,972 | B2 | 3/2016 | Mcculloch et al. |

(Continued)

FOREIGN PATENT DOCUMENTS

| | | | |
|---|---|---|---|
| KR | 10-2144382 | B1 | 8/2020 |
| WO | 2016/173132 | A1 | 11/2016 |

(Continued)

OTHER PUBLICATIONS

Ballard, J., "Most American adults under 30 prefer watching TV with subtitles-even when they know the language", available online at: <https://today.yougov.com/entertainment/articles/45987-american-adults-under-30-watching-tv-subtitles>, Aug. 11, 2023, 7 pages.

(Continued)

*Primary Examiner* — Tan Q Nguyen
(74) *Attorney, Agent, or Firm* — HG LAW LLP

(57) ABSTRACT

Systems and methods are described for dynamic caption presentation on a display unit of a vehicle. Speech data and background noise data are received at one or more microphones associated with a vehicle. User interaction data is received indicating a first confidence level relating to assisting in a user's understanding the speech data. A second confidence level is determined relating to a speech recognition system being able to accurately transcribe the speech data. Vehicle data is received indicating an operational state of the vehicle. It is determined that the first confidence level and the second confidence level are greater than respective first and second confidence thresholds, wherein the first confidence threshold is based on the operational state of the vehicle. Captions are generated for display on the display unit when the first confidence level and the second confidence level are greater than the respective confidence thresholds.

20 Claims, 11 Drawing Sheets

(51) Int. Cl.
*B60K 35/28* (2024.01)
*G10L 15/26* (2006.01)
*G10L 21/0208* (2013.01)

(52) U.S. Cl.
CPC .... *G10L 21/0208* (2013.01); *B60K 2360/148* (2024.01); *B60K 2360/161* (2024.01)

(56) References Cited

U.S. PATENT DOCUMENTS

| | | | |
|---|---|---|---|
| 9,720,644 | B2 | 8/2017 | Ohmura et al. |
| 10,878,819 | B1 | 12/2020 | Chavez et al. |
| 10,916,159 | B2 | 2/2021 | Shintani et al. |
| 11,551,012 | B2 | 1/2023 | Yun et al. |
| 11,558,658 | B2 | 1/2023 | Channapragada et al. |
| 11,651,765 | B2 | 5/2023 | Gray |
| 11,676,577 | B2 | 6/2023 | Aleksic et al. |
| 11,817,101 | B2 | 11/2023 | Hsu et al. |
| 12,100,385 | B2 | 9/2024 | Hung |
| 12,198,681 | B1 | 1/2025 | Sunkara et al. |
| 2013/0144595 | A1 | 6/2013 | Lord et al. |
| 2014/0129207 | A1 | 5/2014 | Bailey et al. |
| 2015/0149169 | A1 | 5/2015 | Chang |
| 2015/0317306 | A1 | 11/2015 | Waibel |
| 2016/0147740 | A1 | 5/2016 | Gao et al. |
| 2017/0148432 | A1 | 5/2017 | Jaramillo et al. |
| 2017/0243582 | A1 | 8/2017 | Menezes et al. |
| 2018/0182375 | A1 | 6/2018 | Fomin |
| 2019/0371318 | A1 | 12/2019 | Shukla |
| 2020/0007946 | A1 | 1/2020 | Olkha |
| 2020/0027445 | A1 | 1/2020 | Raghunathan et al. |
| 2020/0219515 | A1 | 7/2020 | Bhowmik et al. |
| 2020/0372114 | A1 | 11/2020 | Auvenshine et al. |
| 2020/0380959 | A1 | 12/2020 | Chen |
| 2021/0074277 | A1 | 3/2021 | Lewis |
| 2021/0151058 | A1 | 5/2021 | Cheung et al. |
| 2021/0210098 | A1 | 7/2021 | Arar et al. |
| 2021/0334565 | A1* | 10/2021 | Roche .................... B60K 35/29 |
| 2022/0066207 | A1 | 3/2022 | Croxford et al. |
| 2022/0076679 | A1 | 3/2022 | Wu et al. |
| 2022/0358905 | A1 | 11/2022 | Gupta et al. |
| 2022/0382999 | A1 | 12/2022 | Gunasekara et al. |
| 2022/0383862 | A1 | 12/2022 | Aleksic et al. |
| 2023/0071778 | A1 | 3/2023 | Du et al. |
| 2023/0072352 | A1 | 3/2023 | Geng |
| 2023/0186899 | A1 | 6/2023 | Waibel et al. |
| 2023/0245647 | A1 | 8/2023 | Jho et al. |
| 2023/0377558 | A1 | 11/2023 | Lee et al. |
| 2023/0401392 | A1 | 12/2023 | Kumar et al. |
| 2024/0161739 | A1 | 5/2024 | Himmelreich et al. |
| 2024/0340604 | A1 | 10/2024 | Westland et al. |
| 2024/0370671 | A1 | 11/2024 | Xinyao |
| 2024/0430497 | A1 | 12/2024 | Su et al. |
| 2025/0014611 | A1 | 1/2025 | Loccisano |
| 2025/0136130 | A1* | 5/2025 | Shetty ................. B60W 60/001 |
| 2026/0080191 | A1* | 3/2026 | Hu .......................... G06F 40/58 |

FOREIGN PATENT DOCUMENTS

| | | | |
|---|---|---|---|
| WO | 2019/218467 | A1 | 11/2019 |
| WO | 2019/227290 | A1 | 12/2019 |
| WO | 2020/001546 | A1 | 1/2020 |
| WO | 2021/000068 | A1 | 1/2021 |
| WO | 2021/080142 | A1 | 4/2021 |
| WO | 2022/240358 | A1 | 11/2022 |
| WO | 2024/236015 | A1 | 11/2024 |

OTHER PUBLICATIONS

Chapman, W., "Everyone Watches TV with Subtitles Now. How'd That Happen?", InieWire, available online at: <https://www.indiewire.com/features/general/why-more-people-use-subtitles-1234875864/>, Jun. 28, 2023, 7 pages.

Dey, A. K., "Understanding and Using Context", Personal and Ubiquitous Computing, vol. 5, Issue 1, Jan. 2, 2001, pp. 4-7.

Steele, A., "How is Alexa using artificial intelligence?," Medum, available online at https://medium.com/@amysteele1999/how-is-alexa-using-artificial-intelligence-02dfec4bbb5d, Oct. 12, 2025, 14 pages.

Tulsiani, H., et al. "An Efficient Self-Learning Framework for Interactive Spoken Dialog Systems," ICML, 2024, 14 pages.

* cited by examiner

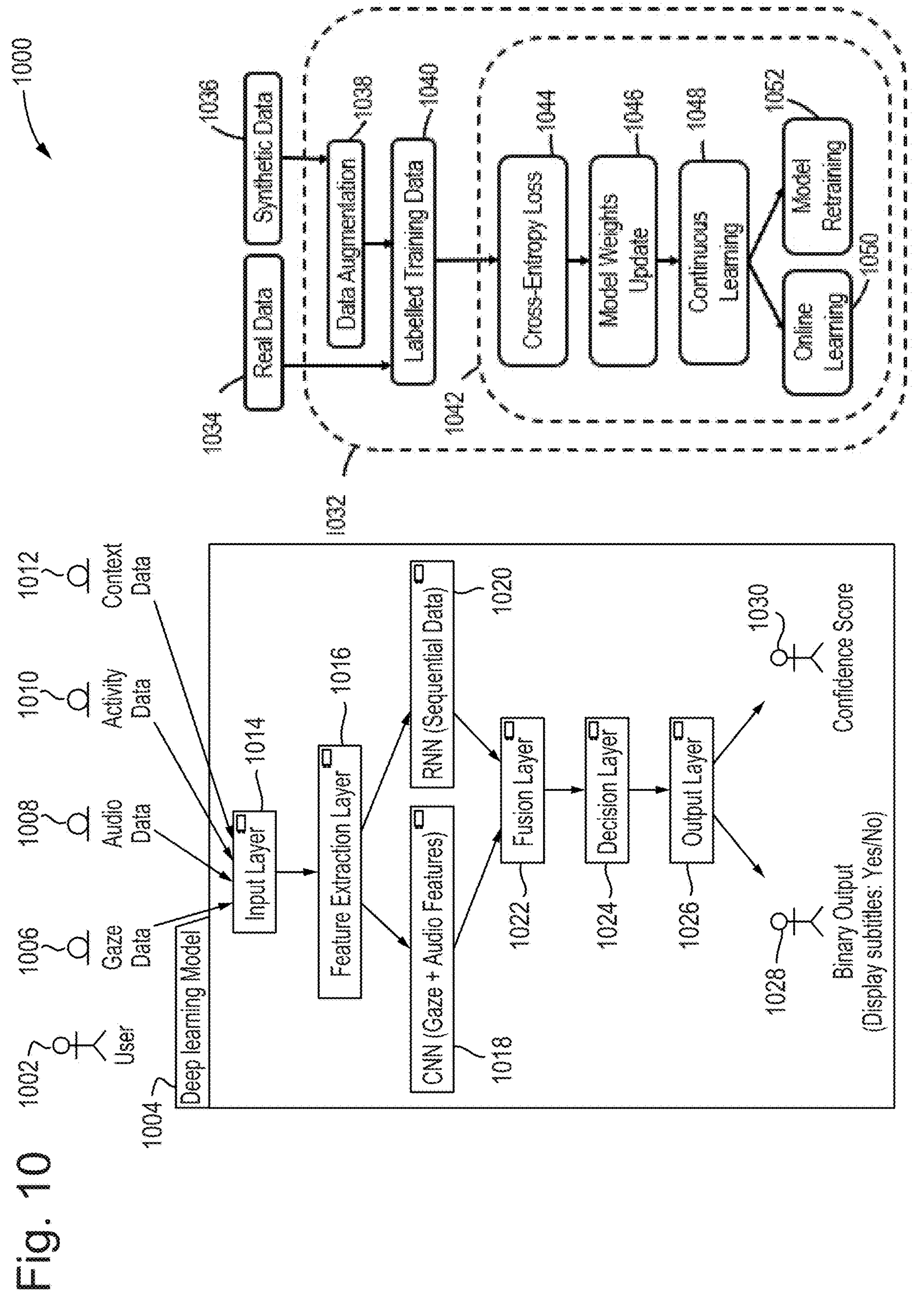
Fig. 10
1000
1002
User
1004
Deep learning Model
1006
Gaze Data
1008
Audio Data
1010
Activity Data
1012
Context Data
1014
Input Layer
1016
Feature Extraction Layer
1018
CNN (Gaze + Audio Features)
1020
RNN (Sequential Data)
1022
Fusion Layer
1024
Decision Layer
1026
Output Layer
1028
Binary Output (Display subtitles: Yes/No)
1030
Confidence Score
1032
1034
Real Data
1036
Synthetic Data
1038
Data Augmentation
1040
Labelled Training Data
1042
1044
Cross-Entropy Loss
1046
Model Weights Update
1048
Continuous Learning
1050
Online Learning
1052
Model Retraining

DYNAMIC CAPTION GENERATION ON A VEHICLE DISPLAY UNIT

BACKGROUND

The present disclosure relates to methods and systems for dynamic captioning of speech data. In particular, but not exclusively, captions are generated on a display unit of a vehicle based on an operational context of the vehicle and probability that an individual in the vehicle may benefit from the provision of captions related to speech of another individual in the vehicle.

SUMMARY

The objective of automatic speech recognition (ASR) is to convert spoken language into captions with the highest possible accuracy. However, in some situations, ASR may not perform well, such as when the environment is noisy, or the speaker has an accent.

Moreover, it is not always necessary or desired to generate captions for display to a user. For example, a user may be able to understand most of a person's speech, e.g., in a particular language, requiring generated captions for only certain words or phrases of the speech.

As such, it is desirable to provide an ASR system that is aware of a user's desired level of support and aware of the environmental context in which ASR systems function. For example, a driver of a vehicle may require, e.g., only at certain times, captioning for a conversation that is happening in a rear seating row of the vehicle.

Unlike traditional ASR systems that operate uniformly regardless of the user's language ability and context, the systems and method disclosed herein can adapt their behavior based on the user's needs, learning when to present subtitles and when to withhold them. For example, the system can use inputs from eye-tracking, environmental noise levels, and user activities to determine when to display captions, ensuring they appear when necessary or is deemed safe to do so.

This approach can leverage machine learning to understand and predict user difficulties with speech comprehension, enabling a more personalized and efficient ASR experience. The ASR system also features a training process that refines its performance over time by gathering data on speech patterns, environment noise and user behavior, making it more accurate in predicting when subtitles are needed. Furthermore, it distinguishes itself from existing technologies by being proactive rather than reactive, stepping in only when the user desires assistance, without requiring manual triggers or commands.

For example, in the context of dynamic caption presentation on a display unit of a vehicle, the method comprises receiving speech data and background noise data at one or more microphones associated with the vehicle. User interaction data is received indicating a first confidence level relating to assisting in a user's understanding the speech data. The user interaction data may comprise eye-tracking data indicating one or more portions of the display unit at which the user is looking, the display unit being configured to display captions. A second confidence level is determined relating to a speech recognition system being able to accurately transcribe the speech data, e.g., by separating it from the background noise data. Vehicle data is received indicating an operational state of the vehicle. The first confidence level and the second confidence level are determined to be greater than the respective first and second confidence thresholds, wherein the first confidence threshold is based on the operational state of the vehicle. Captions are generated for display on the display unit when the first confidence level and the second confidence level are greater than the respective confidence thresholds.

In some examples, the method may comprise vehicle data including at least one of location data, navigational data, speed data, acceleration data, braking data, steering data, communication data, powertrain data, vehicle dimension data, occupancy data, electronic system data, environment data (radio status, window status, traffic data), and any other appropriate type of data associated with a vehicle. In some examples, the operational state of the vehicle may be determined based on one or more changes in the vehicle data.

In some examples, the method may comprise determining a position of a passenger in the vehicle, determining that the speech data is associated with the passenger, and generating for display an indication of the position of the passenger when generating the captions for display.

In some examples, the method may comprise determining the first confidence level based on the user activity data.

In some examples, the method may comprise synchronizing the speech data and the background noise data. In some examples, speech data and background noise data are implicitly synchronized since they are received together at a microphone. In some examples, the method may comprise synchronizing the user interaction data to the speech data and the background noise data.

In some examples, the method may comprise receiving feedback data relating to the generated captions. At least one of the first and second confidence thresholds may be updated or reset based on the feedback data.

In some examples, the user interaction data is aggregated from multiple users.

In some examples, the user interaction data may comprise user behavior patterns. The first and second confidence thresholds may be updated based on the user behavior patterns.

In some examples, the method may comprise determining that at least one of the speech data or the background noise data comprises an audio signature. An adjustment to the first confidence threshold may be caused based on the speech data and/or the background noise data comprising the audio signature.

In some examples, the method may comprise training a network using the speech data, the background noise data, and/or the user interaction data. The trained network may be used to output the first and second confidence levels to cause the captions to be generated for display.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 10 illustrates a diagram for the structure of a network model.

DETAILED DESCRIPTION

Figure 1:
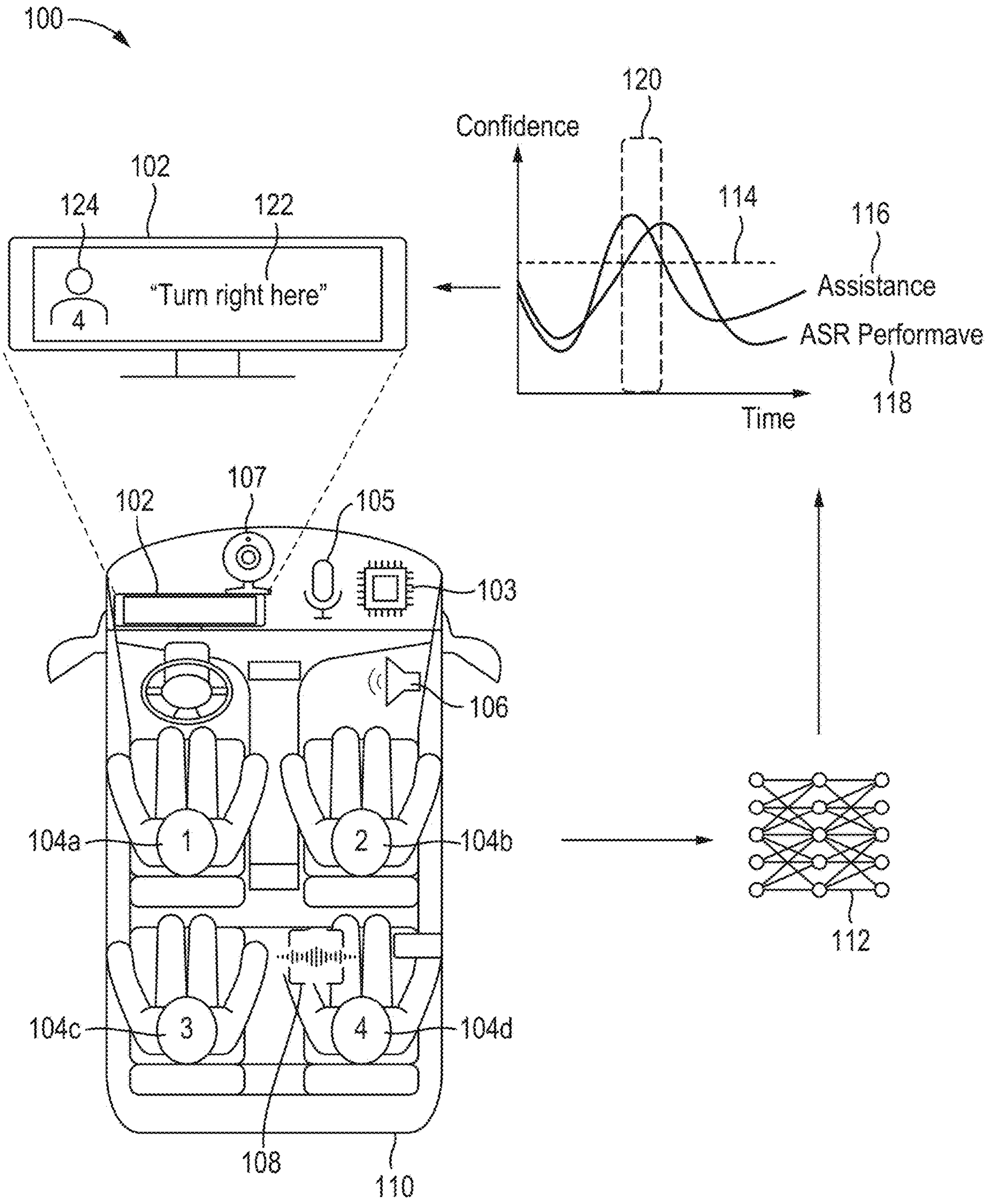
FIG. 1 illustrates an overview of the system for dynamic caption presentation, in accordance with some examples of the disclosure.

FIG. 1 illustrates an overview of a system 100 for dynamic caption presentation, in which a determination to display captions is based on the processing of various sources of audio data and/or video data. In some scenarios, captions may be presented on a vehicle display configured to communicate information to one or more individuals in the vehicle, e.g., to assist the comprehension by one individual in the vehicle of the speech of another individual in the vehicle. In other cases, captions may be presented on any appropriate display, such as a mobile device, an extended reality (XR) device and/or a display screen, e.g., during the display of media content and/or an interaction between users. Various implementations of systems and methods of dynamic caption presentation are disclosed below, which provide for the generation and display of captions based on one or more contextual factors, such as an ability of a user to comprehend speech across a variety of scenarios. In particular, a contextual factor may relate to the safety of a user, the systems and methods determining when, where and how dynamic captions can be presented to a user.

The example shown in FIG. 1 illustrates a vehicle 110 having a display 102, e.g., a screen or a head-up display (HUD), and a controller 103, e.g., an electronic control unit (ECU) of the vehicle, configured to communicate operatively with one or more vehicle systems. In addition, system 100 comprises a microphone 105 configured to receive sound from one or more inputs from inside of and outside of the vehicle, a sound source 106, e.g., a speaker of a sound system of the vehicle 110, and a camera 107 configured to receive sound from one or more inputs from inside of and outside of the vehicle. In some examples, the microphone 105 is a vehicle component, and may be part of an array of microphones positioned around the vehicle. Additionally or alternatively, microphone 105 may be a component of a user device, such as a smart phone. In some examples, system 100 may comprise a set of microphones distributed across devices. For example, system 100 may comprise a first microphone of a vehicle and a second microphone of a mobile device.

In the example shown, there is a plurality of users 104*a-d* present in the vehicle 110, which may be a car or any other appropriate type of vehicle. In FIG. 1, a user 104*d*, e.g., a passenger, is communicating (or attempting to communicate) with a user 104*a*, e.g., a driver. For example, users 104*a* and 104*d* may be having a conversation regarding navigation of the vehicle. For the avoidance of doubt, the term "user", as claimed, can be any of the users 104*a-d* present in the vehicle 110. In other words, any generated captions need not be for the benefit of a driver of the vehicle, but, additionally or alternatively, for the benefit of a passenger of the vehicle.

In FIG. 1, user 104*d* says to user 104*a* "Turn right here?". Speech data 108 is received at microphone 105, as background noise 106 occurs or increases in volume, which is also received at microphone 105. With the speech and background noise occurring concurrently, user 104*a* may struggle to comprehend the speech 108 of user 104*d*. In some cases, this may lead to the driver 104*a* having reduced comprehension of user 104*d*. For example, user 104*a* may not hear or may mishear a navigational instruction being given by user 104*d*. For example, user 104*a* may hear "Turn, right there", instead of "Turn right here". The present disclosure, as discussed in detail below, provides improved systems and methods for displaying captions to a user, wherein the determination to display captions may be based on a plurality of factors, such as a determined level of assistance provided to a user for understanding a speech input (e.g., needed, wanted or otherwise issued captions for improving comprehension), an ability for a speech recognition system to accurately determine the speech input, and an environmental safety factor (e.g., an operative mode of a vehicle) that may influence or otherwise be used to determine whether it is appropriate to generate captions for display. For example, the environmental factor may be used to determine whether it is safe to generate captions for display to a user, e.g., based on a level of cognitive burden of the user and/or a need for a user to pay attention to the environment.

In some examples, one or more microphones may be used to gather audio data. Microphones may be mounted in the cabin of a vehicle, and/or provided via one or more devices such as headsets and phones, communicatively coupled to control circuitry of the vehicle 110, e.g., via network 208. In the example present in FIG. 1, microphone 105 is an interior microphone of vehicle 110, and may be used in combination with an exterior vehicle microphone, and/or one or more microphones of devices present in the vehicle 110, e.g., of smartphones of users 104*a-d.*

In some examples, one or more cameras may be used to gather video data. Cameras may be mounted in the cabin of a vehicle, and/or provided via one or more devices such as headsets and phones, communicatively coupled to the control circuitry of the vehicle 110, e.g., via network 208. In the example present in FIG. 1, camera 107 is an interior camera of vehicle 110, and may be used in combination with an exterior vehicle camera, and/or one or more cameras of devices present in the vehicle 110, e.g., of smartphones of users 104*a-d.*

System 100 comprises control circuitry, such as network 112, configured to receive and process audio data and video data. In FIG. 1, network 112 is configured to receive and process audio data captured at microphone 105, receive and process video data captured at camera 107, and output one or more control signals for generating captions on display 102 of the vehicle 110.

Presented in FIG. 1, audio data comprising background noise data and speech data is passed to and processed by network 112, as well as a plurality of additional factors including, but not limited to, eye-tracking data, gaze patterns, activity data, environmental audio, ambient noise levels, explicit user feedback, implicit feedback, and vehicle data. Factors influencing the first and second confidence levels and first and second confidence thresholds may be received via any appropriate means or device, such as cameras, and microphones used either alone or in conjunction. After processing, the value of at least one of the predicted help level 116 and ASR performance level 118 may change in value, e.g., as a result of a change in one or more of the above factors. FIG. 1 illustrates an example wherein the predicted help threshold and ASR performance threshold have a shared threshold level 114, but in other examples, they each may have a respective threshold level.

In some examples, control circuitry may implement any appropriate audio recording method to determine factors influencing the first and second confidence levels and first and second confidence thresholds. For example, audio data may be used to determine whether a user 104*a* is asking someone to repeat themselves, e.g., indicating that the user 104*a* is struggling to comprehend. In the example presented in FIG. 1, background noise data may be identified in the form of external noise 106, potentially causing decreased comprehension for user 104*a*. Other examples may include, but are not limited to, analyzing speech data (e.g., for a user's dialect or language) and analyzing ambient noise levels (e.g., for certain frequencies that may affect the comprehension of speech).

In some examples, control circuitry may implement any appropriate video recording method to determine factors influencing the first and second confidence levels and first and second confidence thresholds. For example, gaze tracking algorithms may determine whether the user 104*a* glances at where captions 122 may typically be displayed on a device 102, e.g., indicating that the user 104*a* requires the use of captions. In another example, gaze tracking may be implemented to track the gaze of users 104*b-d*, e.g., to determine whether the gaze of any of users 104*b-d* is upon user 104*a*, therefore potentially indicating that user 104*b-d* is speaking to the user 104*a*. Another example may be where the user 104*a* is looking at user 104*d* using a rear-view mirror, e.g., to gain a better understanding of what user 104*d* is saying in the rear of the vehicle. In some examples, a neural network 112 is used to process the factors at least to calculate the value of assistance 116 and ASR performance 118.

In FIG. 1, with factors received at network 112 for the calculation of the first confidence level, e.g. assistance 116, and the second confidence level, e.g., ASR performance 118, network 112 processes the speech and noise data in view of the factors to calculate assistance 116 and ASR performance 118.

In some embodiments, network 112 may be a machine learning model, for example, a neural network, e.g., a recurrent neural network, a convolutional neural network, an artificial neural network, a transformer, a classifier, or any other suitable type of machine learning model, or any combination thereof. In some embodiments, network 112 may be trained to obtain any of speech data, background noise data, video data, explicit feedback data, and/or implicit feedback data. The network parameters may be trained and/or updated during use of the network and/or when not in operation.

In some embodiments, the network 112 may be trained by an iterative process of adjusting weights (and/or other parameters) for one or more layers of the network 112. For example, the Context-Adaptive Processing Unit (CAPU) 610, as presented in FIG. 6, may compare the delivery of caption data obtained when training data is input to network 112 to a ground truth value, e.g., an annotated indication of the correct delivery of caption data. The CAPU may then adjust the weights or other parameters of network 112 based on how closely the output corresponds to the ground truth value. The training process may be repeated until results stop improving or until a certain performance level is achieved (e.g., until 95% of the time that captions are provided, the user actually needs them). In some embodiments, network 112 may be trained to learn features and patterns with respect to input images and gaze angle sequences. Such learned patterns and inferences may be applied to received data once network 112 is trained. In some embodiments, network 112 may be trained or may continue to be trained on the fly or may be adjusted on the fly for continuous improvement, based on input data and inferences or patterns drawn from the input data, and/or based on comparisons after a particular number of cycles. In some embodiments, network 112 may comprise any suitable number of parameters.

In some embodiments, network 112 may be trained with any suitable amount of training data from any suitable number and/or types of sources. In some embodiments, network 112 may be trained by way of unsupervised learning, e.g., to recognize and learn patterns based on unlabeled data. In some embodiments, network 112 may be trained by supervised training with labeled training examples to help the model converge to an acceptable error range, e.g., to refine parameters, such as weights and/or bias values and/or other internal model logic, to minimize a loss function.

In some embodiments, each layer may comprise one or more nodes that may be associated with learned parameters (e.g., weights and/or biases), and/or connections between nodes may represent parameters learned during training (e.g., using backpropagation techniques, and/or any other suitable technique). In some embodiments, the nature of the connections may enable or inhibit certain nodes of the network. The network 112 may automatically set or receive manual selection of a learning rate, e.g., indicating how quickly parameters should be adjusted. In some embodiments, the training image data may be suitably formatted and/or labeled by human annotators or otherwise labeled via a computer-implemented process. As an example, such labels may be categorized as metadata attributes stored in conjunction with or appended to the training image data. Any suitable network training patch size and batch size may be employed for training network 112. In some embodiments, network 112 may be trained at least in part using a feedback loop, e.g., to help learn user preferences over time. In some embodiments, the CAPU may perform any suitable pre-processing steps with respect to training data, and/or data to be input to the trained network model. Network model 112, audio data, video data, and feedback data may be stored at (and/or implemented at) any suitable device(s) and/or server(s) associated with the network model 112.

As described, trained network model 112 may be used to output a decision to provide captions to the display device, e.g., display 102 of FIG. 1. The decision may be based on a user's likely need for caption assistance and a predicted accuracy of the ASR system, which affect the user's cognitive burden upon receiving captions. For example, trained network 112 may receive as input, audio data, e.g., background noise data 106 and speech data 108. In some examples, this allows for the determination for whether to provide captions to the user. In some examples, this allows for the determination as to what captions to provide to the user. In some embodiments, trained network model 112 may receive as input historical user data of the current user, e.g., indicating a user's preference for certain activities, etc. Based on these inputs, trained network model 112 may output one or more decisions for providing captions. In some embodiments, network model 112 may comprise or be in communication with a generative AI model, which may be configured to enhance network model 112. In some examples, data is preprocessed before input for network model 112, for example, audio data may be preprocessed into a spectrogram as input into network model 112.

In some examples, control circuitry may implement any appropriate audio recording method to determine the origin of audio data. In the example provided by FIG. 1, captions 122 comprise a source indication 124 as to which of the passengers 104*b-d* of the car 110 is speaking. In other examples, control circuitry may look to indicate a relative direction of the origin of sound. The direction of the sound may be determined by any appropriate method, including, but not limited to, the use of microphones, cameras, or other audio-visual recording devices.

In some examples, control circuitry may implement any appropriate video recording method to determine the origin of audio data. For example, video recording techniques may be used to identify that a passenger is talking to a driver. In the example provided by FIG. 1, the system may identify that user 104*d* has his head pointed towards the driver 104*a*, and that the mouth of 104*d* is moving, thereby indicating that 104*d* may be talking to user 104*a*.

In the example presented in FIG. 1, the first confidence level, e.g., assistance 116, and the second confidence level, e.g., ASR performance 118, are above the respective thresholds, e.g., threshold 114. Presented in FIG. 1, the user 104*d* says "Turn right here" to user 104*a*, as such when assistance 116 and ASR performance 118 are both above threshold 114, and captions 122 displaying "Turn right here" are presented. Looking at the graph presented in FIG. 1, when both the assistance 116 and ASR performance 118 are below the threshold 114, (for example during the first trough of both curves), captions are not presented. However, as background noise 106 increases in volume, assistance 116 may be affected, in FIG. 1, assistance 116 increases as a result of the increase in volume of 116. ASR performance 118 also increases in volume, although not shown, this may be because the volume of speech 108 of user 104*d* has increased in volume. In FIG. 1, the user speaking to user 104*a* is user 104*d*, the fourth user, as such when the system presents captions, the location of user 104*a* is presented in the form of location caption 124.

In some examples, captions 122 are provided to the user when the predicted help level 116 and the ASR performance level 118 exceed a respective threshold. A time interval where both the predicted help level 116 and the ASR performance level 118 exceed their respective thresholds may be referred to as a caption provision window. During the caption provision window 120, system 100 may display captions 122 to a user using a display 102, e.g., a heads-up display. A displaying of captions on display 102 allows a user to process audio information visually, thereby, in the example of FIG. 1, allowing a user to comprehend speech, e.g., irrespective of a level of background noise or any other factor(s) affecting the user's ability to comprehend speech.

In the example present in FIG. 1, system 100 comprises a car with a heads-up display for displaying captions 122 to the user. However, the display device may be any appropriate type of device configured to display information, such as a headrest display, an augmented display, a TV, or the like, used either alone or in combination.

In some examples, captions 122 may comprise, but are not limited to, at least one of captions of speech, captions corresponding to audio other than speech (e.g., sirens, music, etc.), an indication of direction of the source of the audio, or an indication to the volume or proximity of the audio. Captions may be in response to any appropriate scenario, and the provision of captions may be specifically configured for a user profile, e.g., using model refinement based on explicit and implicit feedback received from the user. In the example shown in FIG. 1, the predicted help level 116 increases and decreases as a function of time. For example. The predicted help level 116 may rise as a result of environmental noise, e.g., background noise 106, leading to a reduction in the comprehension of user 104*d* by user 104*a*. Conversely, should the environmental noise fall, user 104*a* might be able to more easily comprehend the speech of user 104*d*. As such, control circuitry is configured to provide captions for display of the conversation between users 104*a* and 104*d* based on an environmental context which defines (at least in part) how likely it is that user 104*a* can understand the speech of user 104*d*. However, in other scenarios, other appropriate forms of captions may be displayed to a user, such as the direction of an important noise other than speech.

In some examples, control circuitry may determine scenarios wherein captions should not be displayed. Representative examples of this may be when a private conversation is taking place between passengers in a car, or when important audio is detected, for example horns or sirens. In such situations, control circuitry may look to hide captions from the user. In such situations, control circuitry may use any appropriate method of identifying important audio, for example, the system may utilize audio signatures to detect horns or sirens, or analyze the volume and context of a conversation. In some examples, the user may be capable of manually selecting to turn on or turn off the captions.

In some examples, system 100, 200 can capture explicit feedback and/or implicit feedback. Explicit feedback may include, but is not limited to, user adjustment of settings of the model. For example, a user may indicate explicitly, e.g., by virtue of a user interface on display 102 or otherwise, whether the displayed captions were useful in assisting the understanding of speech, a degree or level of usefulness, and/or whether the captions were even needed or desired. In some examples, a request for user feedback may be issued, e.g., on a rolling basis as captions are presented, and/or at a determined frequency.

Implicit feedback may include, but is not limited to, user gaze behavior and user speech data, and/or any other appropriate type of data (e.g., biometric data) from which a user reaction to captions may be inferred.

In some examples, implicit feedback may comprise eye-tracking data indicating one or more portions of the display unit at which the user is looking. If, when captions are not being presented, the user repeatedly looks at the portion of display which typically would have captions present, then this may be taken as an indication and/or implicit feedback that the user, e.g., user 104*a*, may benefit from caption assistance. The inverse of this may also be true, e.g., when the user is not looking at the portion of the display unit typically associated with captions, whilst captions are being presented, control circuitry may determine that this is an indication and/or implicit feedback that captions are not required, or have been deemed not useful.

Feedback may be captured using any appropriate method of data capture, for example recording equipment such as microphones and cameras may be used to identify the gaze of a user, or speech data indicating that the user cannot understand. Feedback may be used to improve accuracy in determined assistance level 116 and ASR performance 118 level. The system may validate performance using directly requested user feedback, e.g., requesting the user whether or not a caption was useful. This data may also be present and processed in a real-time data feedback loop, e.g., as the user interacts with the system, the data is processed in real-time.

In some examples, control circuitry may enable model refinement, in order to better reflect the user's ability to comprehend in certain scenarios. For example, the system may identify patterns in user behavior and adapt the model accordingly. For example, if the user consistently requires captions during certain activities or in noisy environments, therefore allowing for proactive threshold adjustment. Another such example may be profile adaptation, wherein the system is capable of identifying distinct profiles of a user, thereby allowing the user to have different model profiles based on context, for example a "work" and "home" profile. In some examples, the user may be capable of creating profiles manually. These techniques of model refinement can be further implemented for multiple profiles for multiple users. For example, a user who is hearing impaired may have a user profile which provides captions more often than another user.

Figure 2:
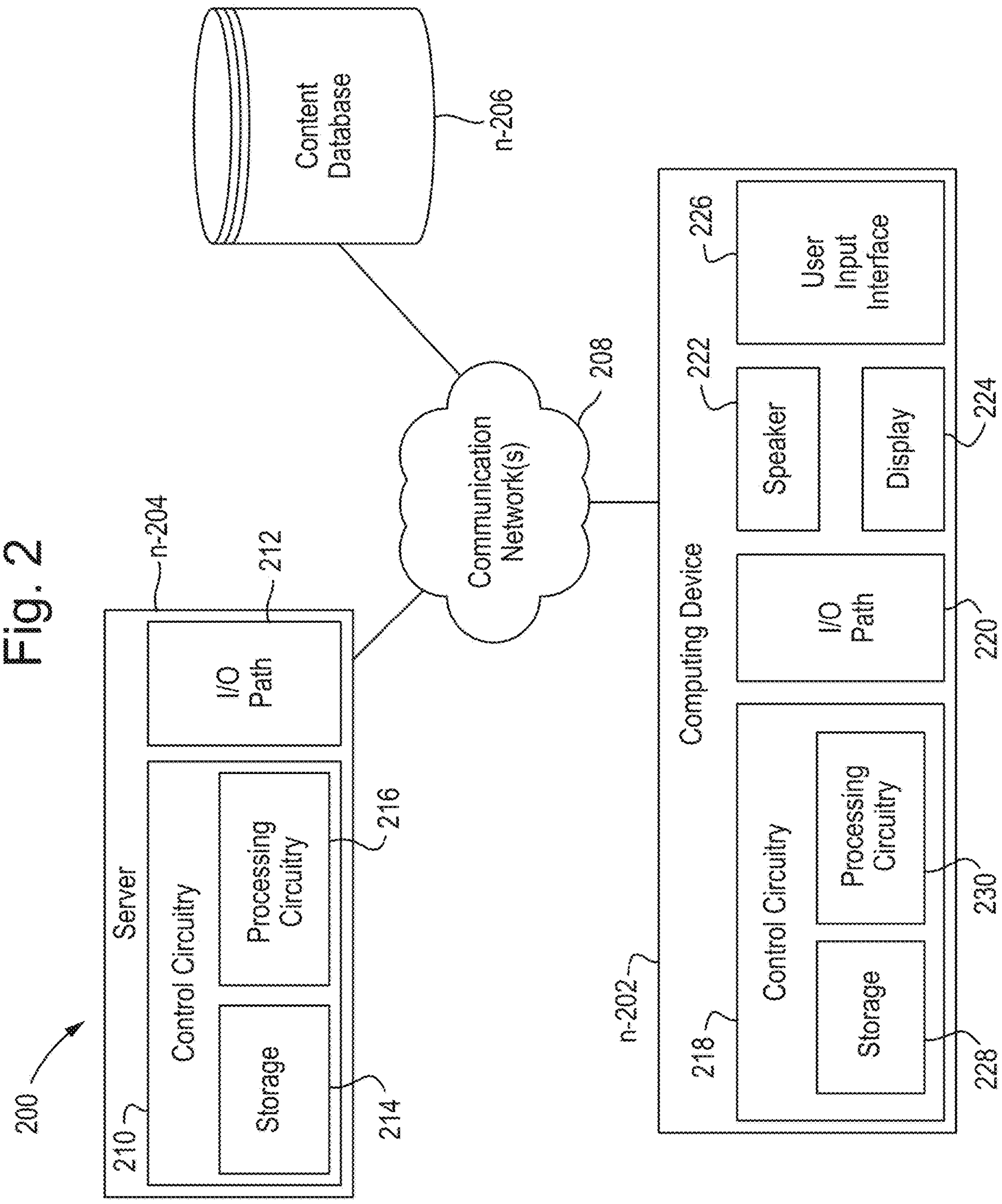
FIG. 2 is a block diagram showing components of an example system for providing media content, in accordance with some examples of the disclosure.

FIG. 2 is an illustrative block diagram showing example system 200, e.g., a non-transitory computer-readable medium, configured to generate display of one or more display elements, such as display element 102. Although FIG. 2 shows system 200 as including a number and configuration of individual components, in some examples, any number of the components of system 200 may be combined and/or integrated as one device, e.g., as display device 102. System 200 includes computing device n-202 (denoting any appropriate number of computing devices) server n-204 (denoting any appropriate number of servers), and one or more content databases n-206 (denoting any appropriate number of content databases), each of which is communicatively coupled to communication network 208, which may be the Internet or any other suitable network or group of networks. In some examples, system 200 excludes server n-204, and functionality that would otherwise be implemented by server n-204 is instead implemented by other components of system 200, such as computing device n-202. For example, computing device n-202 may implement some or all of the functionality of server n-204, allowing computing device n-202 to communicate directly with content database n-206. In still other examples, server n-204 works in conjunction with computing device n-202 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device n-202, which may be a HMD, a personal computer, a laptop computer, a tablet computer, a smartphone, a smart television, or any other type of computing device, includes control circuitry 218, I/O path 220, speaker 222, display 224, and user input interface 226. Control circuitry 218 includes storage 228 and processing circuitry 220. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or used instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from the application. For example, the application may be implemented as software or a set of executable instructions that may be stored in storage 214 and/or 228 and executed by control circuitry 210 and/or 218. In some examples, the application may be a client/server application where only a client application resides on computing device n-202, and a server application resides on server n-204.

The application may be implemented using any suitable architecture. For example, it may be a stand-alone application wholly implemented on computing device n-202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server n-204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210) and/or generate displays. Computing device n-202 may receive the displays generated by the remote server and may display the content of the displays locally via display 224. This way, the processing of the instructions is performed remotely (e.g., by server n-204) while the resulting displays, such as the display windows described elsewhere herein, are provided locally on computing device n-202. Computing device n-202 may receive inputs from the user via input interface 226 and transmit those inputs to the remote server for processing and generating the corresponding displays.

A computing device n-202 may send instructions, e.g., to select media content and provide it for display, to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server n-204 and computing device n-202 may transmit and receive content and data via I/O path 212 and 220, respectively. For instance, I/O path 212, and/or I/O path 220 may include a communication port(s) configured to transmit and/or receive (for instance to and/or from content database 206), via communication network 208, content item identifiers, content metadata, natural language queries, and/or other data. Control circuitry 210 and/or 218 may be used to send and receive commands, requests, and other suitable data using I/O paths 212 and/or 220.

Figure 3:
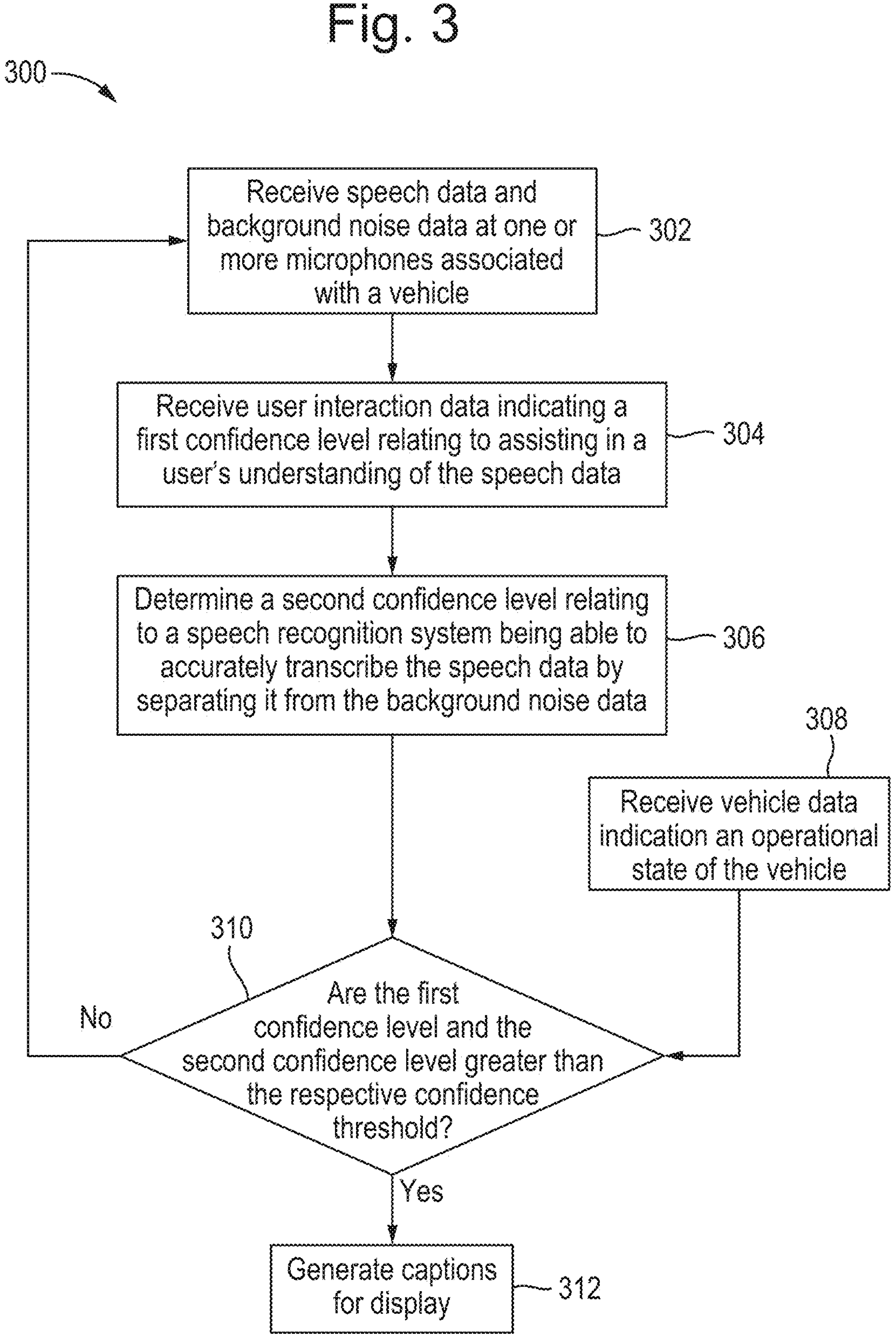
FIG. 3 is a flowchart representing a process for dynamic caption presentation, in accordance with some examples of the disclosure.
Figure 4:
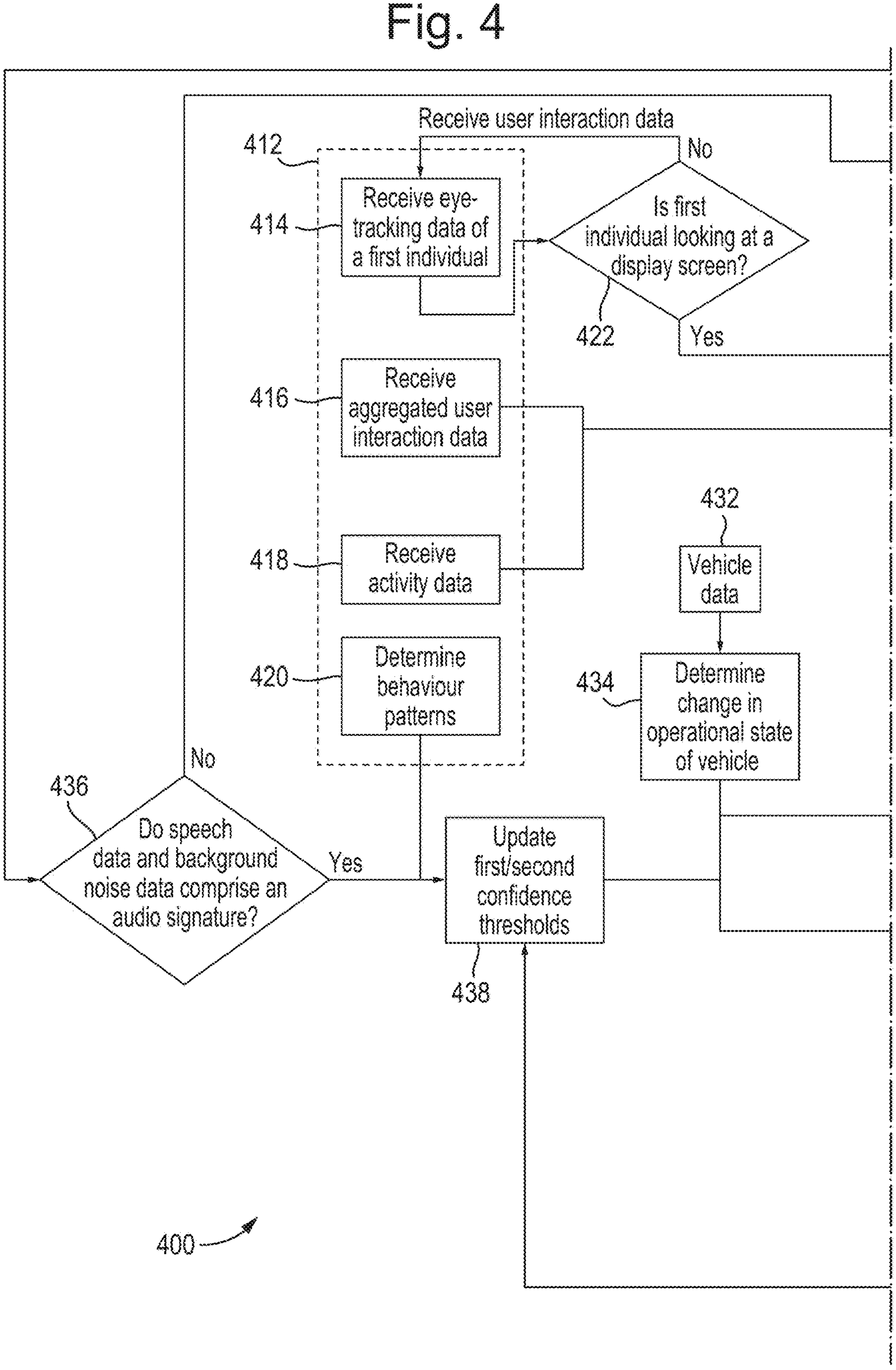
FIG. 4 illustrates a flowchart representing a process for dynamic caption presentation, in accordance with some examples of the disclosure.
Figure 4:
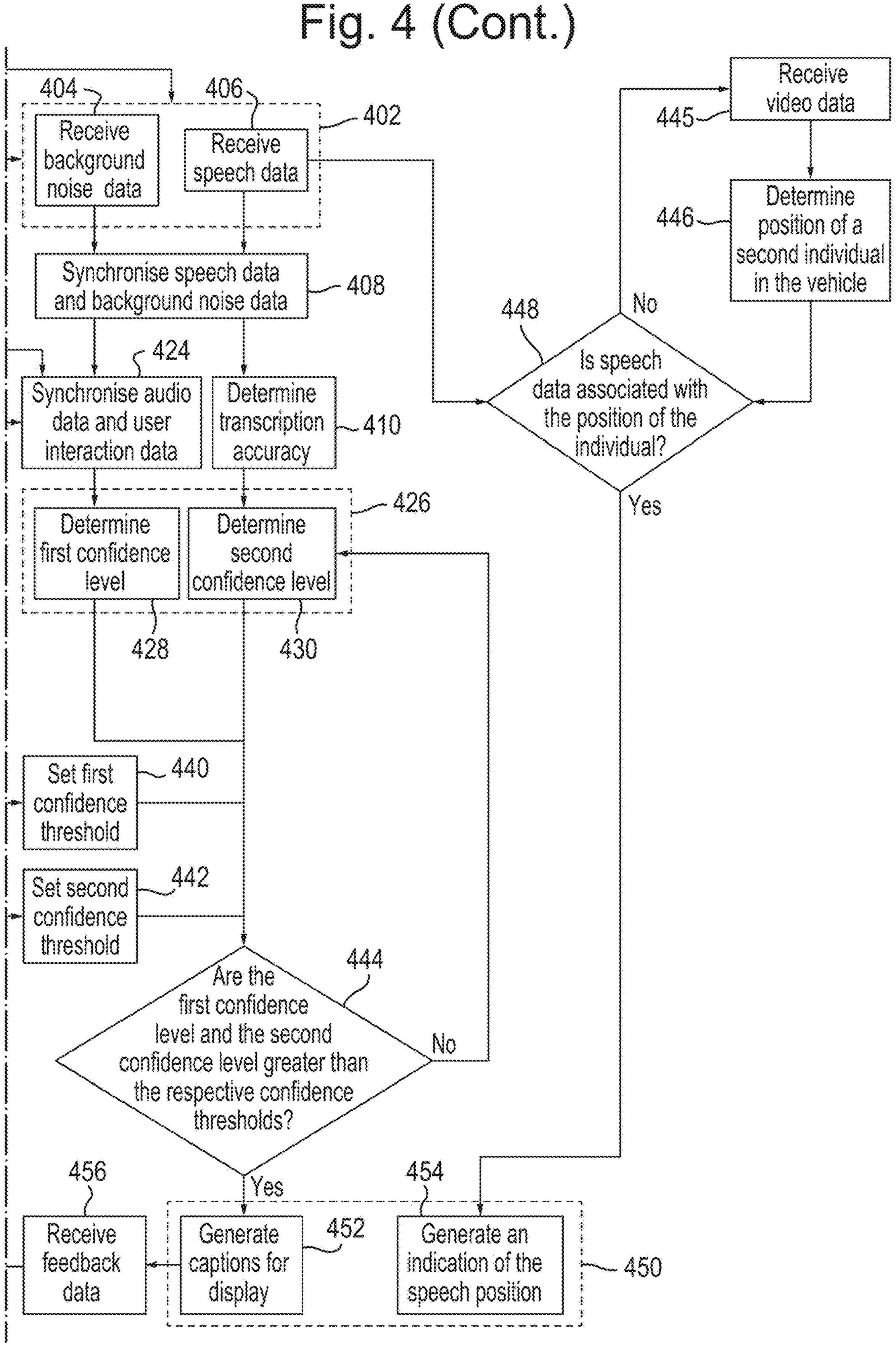
Figure 5:
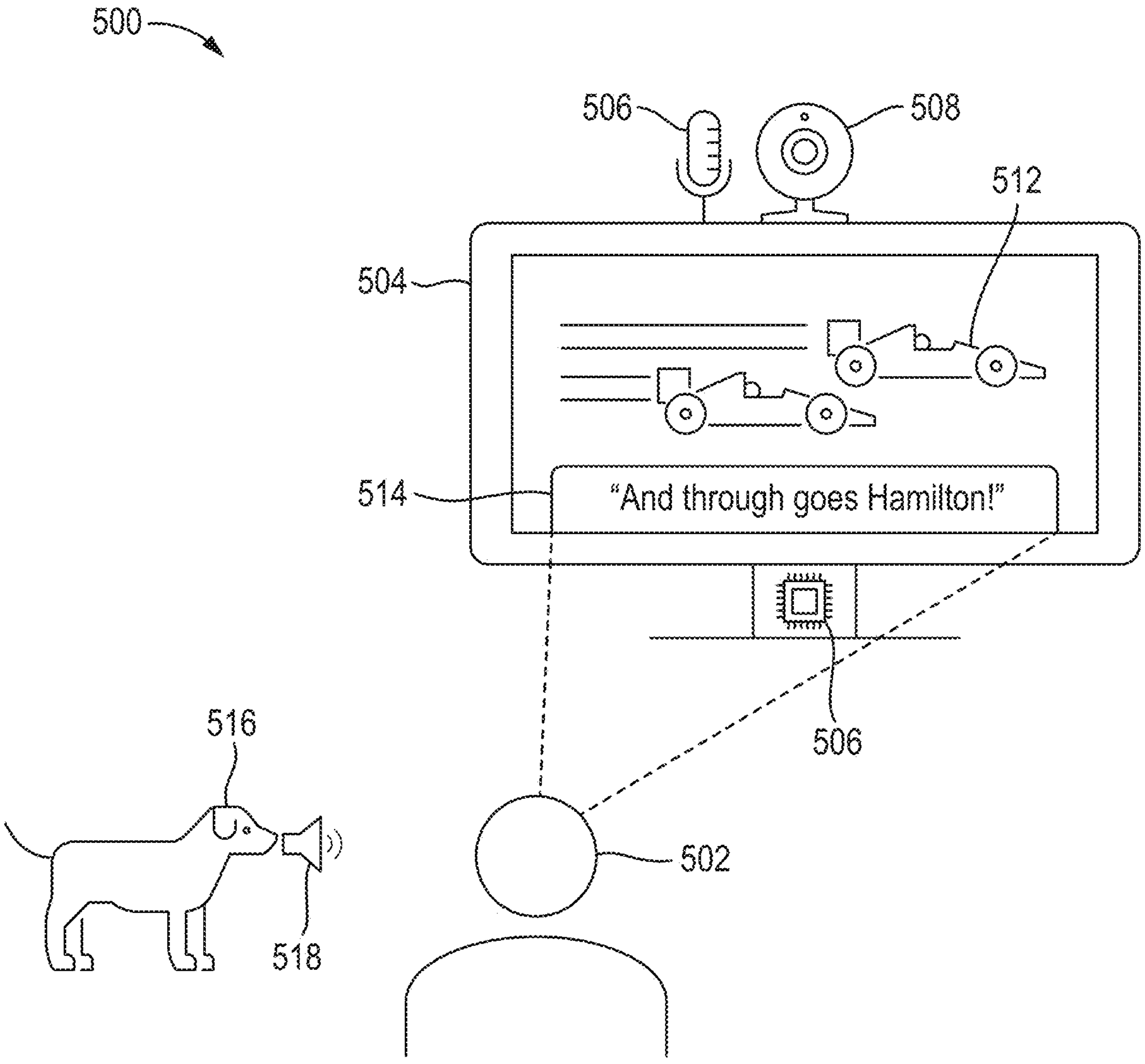
FIG. 5 illustrates system for dynamic caption presentation, in accordance with some examples of the disclosure.
Figure 6:
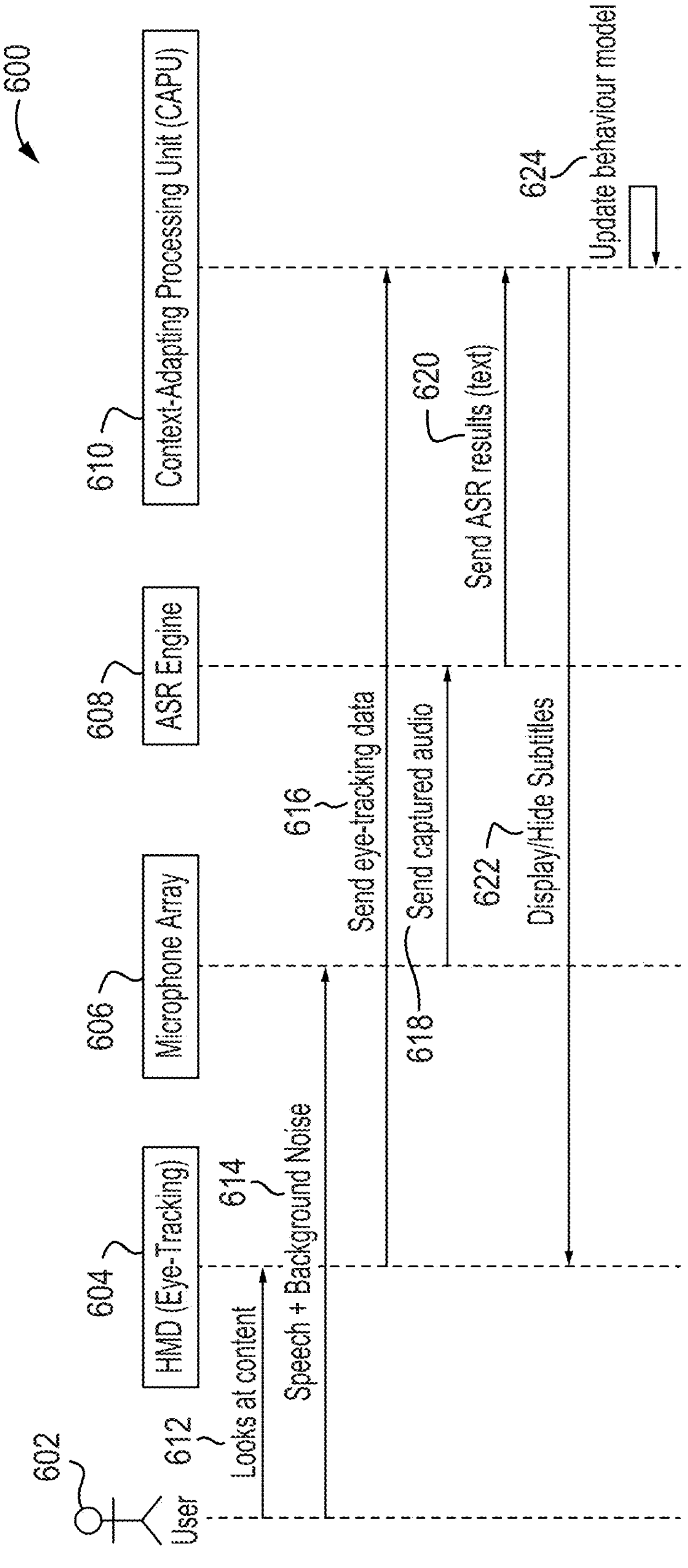
FIG. 6 illustrates a sequence diagram for dynamic caption generation, in accordance with some examples of the disclosure.
Figure 7:
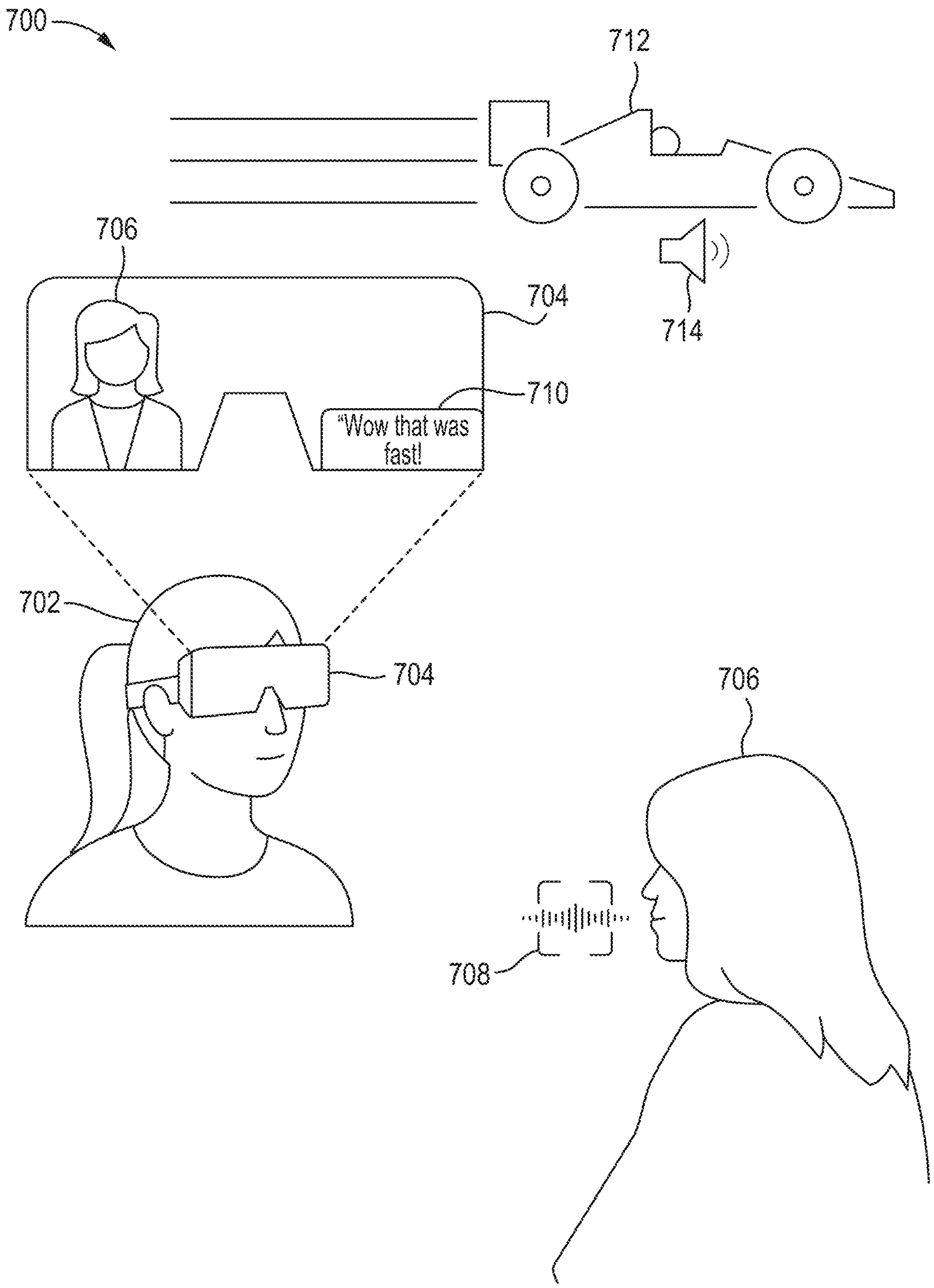
FIG. 7 illustrates a system for dynamic caption presentation, in accordance with some examples of the disclosure.
Figure 8:
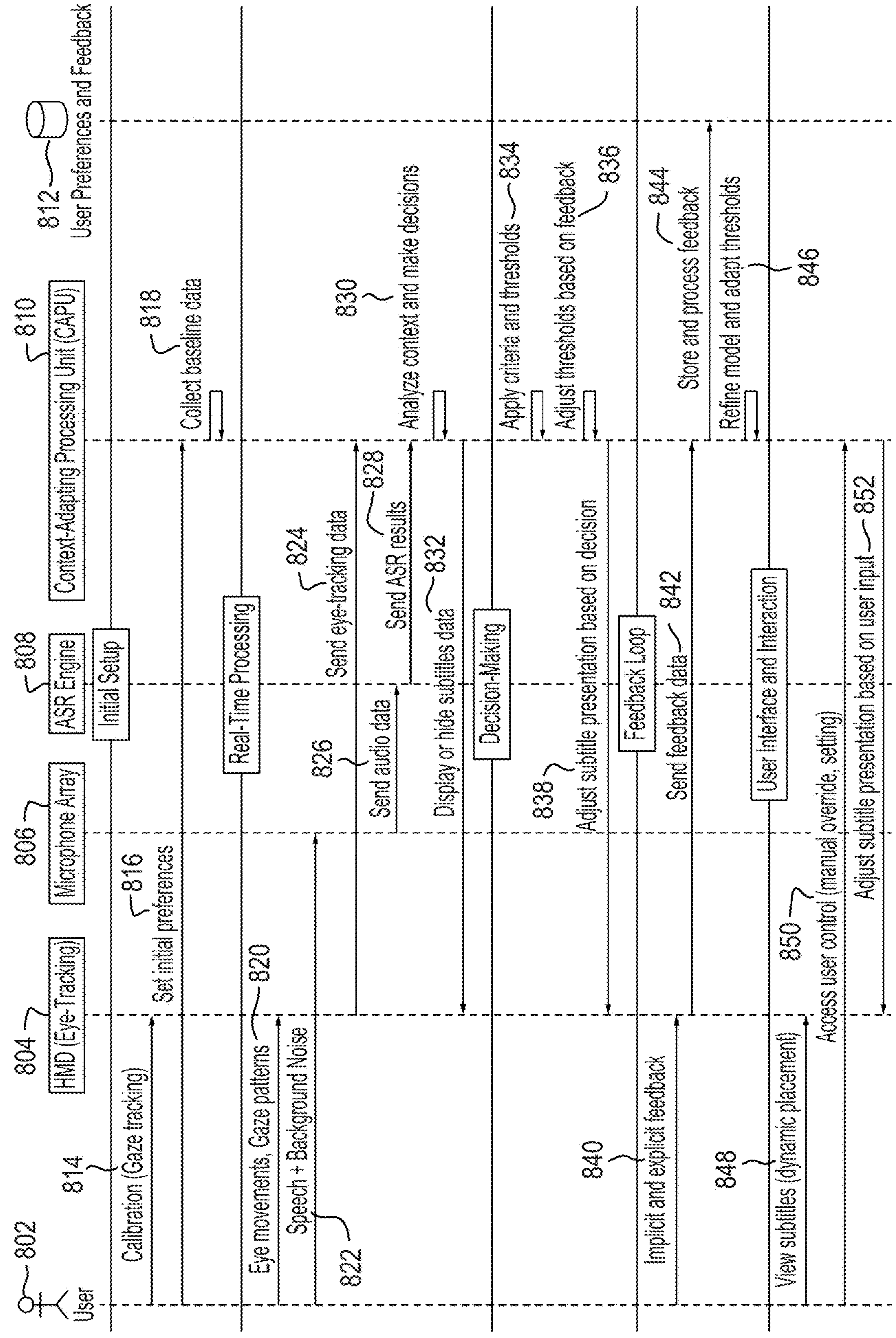
FIG. 8 illustrates a sequence diagram for dynamic caption generation, in accordance with some examples of the disclosure.
Figure 9:
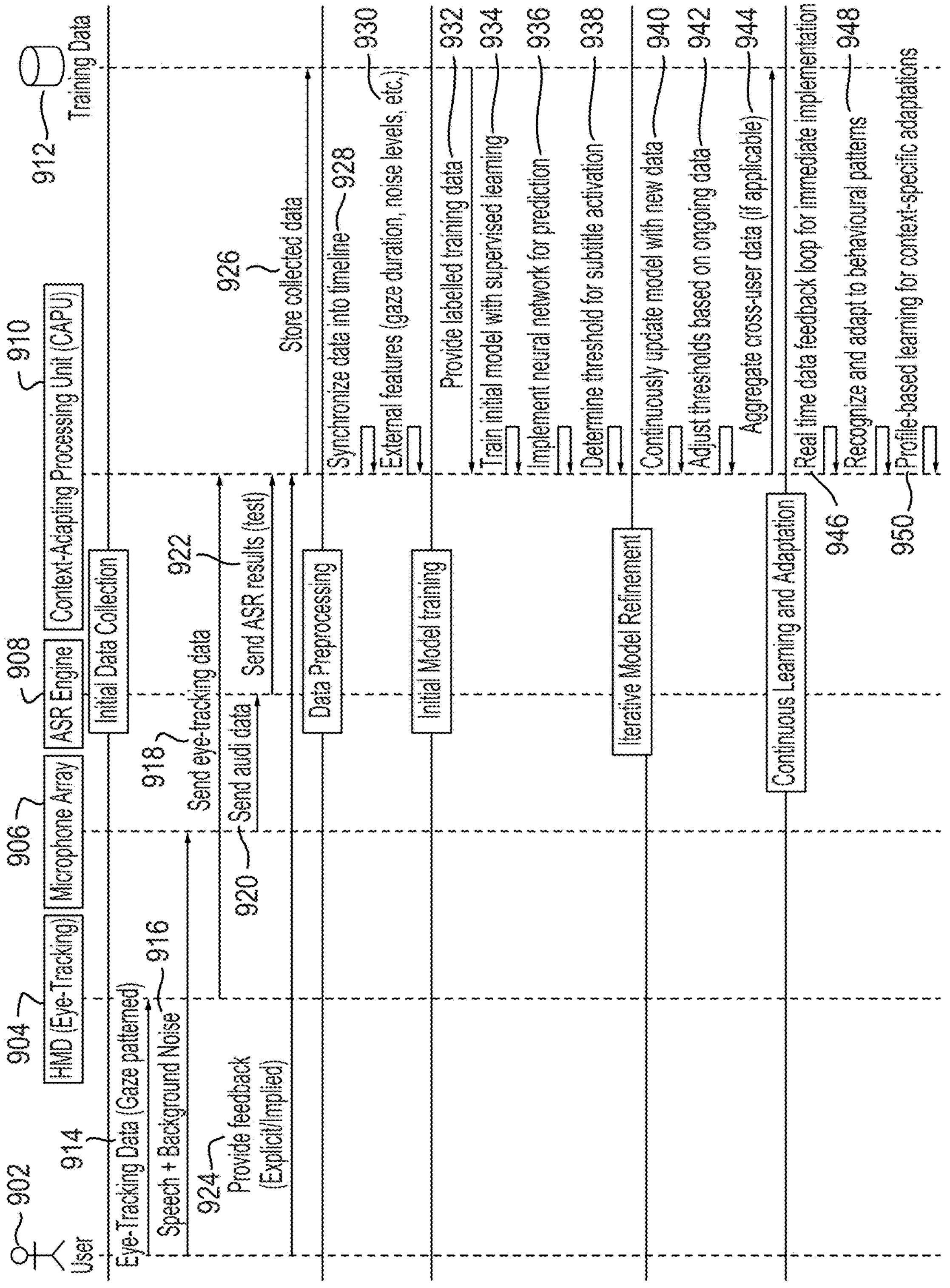
FIG. 9 illustrates a sequence diagram for training a network model, in accordance with some examples of the disclosure.

FIG. 3 shows a flowchart representing an illustrative process 300 for dynamic presentation of captions. FIG. 4 shows a flowchart representing an illustrative process 400 for dynamic presentation of captions. FIG. 5 illustrates a display exhibiting an example embodiment. FIG. 6 illustrates a process diagram for an embodiment of dynamic caption presentation. FIG. 7 illustrates a wearable screen exhibiting an example embodiment. FIG. 8 illustrates a process diagram for an embodiment of dynamic caption presentation. FIG. 9 illustrates a process diagram for an embodiment of network model refinement. FIG. 10 illustrates an embodiment of the structure of the network model. For the avoidance of doubt, the features described below in relation to the process shown in FIG. 3 and/or FIG. 4 may be implemented in one or more of the systems illustrated in FIGS. 1, 2, 5 and 7.

Returning to FIG. 3, at 302, control circuitry, e.g., control circuitry 218 presented in FIG. 2, receives speech data and background noise data at one or more microphones, e.g., microphone 105 presented in FIG. 1. Speech data may for example be that of FIG. 1, where a passenger 104*d* of the vehicle is having (or is at least trying to have) a conversation with a user 104*a*. Although not shown in FIG. 1, the speech data may comprise data from one or more sound sources external to the vehicle. For example, the speech data may result from one or more conversations external to the vehicle, and/or from a conversation between vehicles, e.g., by virtue of a communication device, such as a head set or a telecommunication link Background noise data for example, may be any sound data different from the speech data, for example sound 106 presented in FIG. 1. In some examples, the background noise may be produced by any appropriate sound source, such as a sound source from within the vehicle 110, e.g., music from a speaker and/or conversation between passengers 104*b* and 104*c*. Additionally or alternatively, the background noise may be produced by a sound source external to the vehicle, e.g., by another vehicle and/or environmental noise around the vehicle.

At 304, control circuitry, e.g., control circuitry 218 presented in FIG. 2, receives user interaction data, e.g., interaction data of user 104*a* presented in FIG. 1. The user interaction data indicates a first confidence level, e.g., a first confidence level relating to assistance 116 presented in FIG. 1. The first confidence level relates to a probability that a value of a parameter falls within a specified range of values, indicating that a user might benefit from assistance in the understanding of speech data. For example, user interaction data may include, but is not limited to: eye-tracking data, gaze patterns, and activity data such as walking or running. Such user interaction data may indicate that user 104*d* is communicating (or attempting to communicate) with user 104*a*.

In some examples, determining the first confidence level comprises analyzing eye tracking data comprising a set of values indicating one or more positions on a display at which the user is looking. In some examples, the set of values may be regarded as a parameter for use in determining the first confidence level. Should the set of values indicating the position at which the user is looking fall within a specified range of positions, the eye tracking data might indicate that the user is seeking assistance, e.g., by virtue of the user looking at a position of the display configured to display captions. For example, user interaction data may indicate that user 104*a* is struggling to understand user 104*d* if user 104*a* repeatedly looks at the location at which captions can be displayed in vehicle 110, e.g., caption location 122 of display device 102. In another example, eye-tracking data may indicate that user 104*a* is turning to face user 104*d* and focusing on the mouth/lips of user 104*d* as user 104*d* is speaking, indicating that the user 104*a* is struggling to comprehend user 104*d*.

In some examples, determining the first confidence level for providing assistance comprises determining a volume level of speech data and/or background noise data. Volume level may be quantified in decibels and determined using one or more recording devices, e.g., microphone 105 as presented in FIG. 1. For example, speech data of a high decibel value in combination with background noise data of a low decibel value may contribute to a decrease in the first confidence level value. Since the speech data is relatively loud compared to the background noise data, the likelihood of providing caption data resulting in an increased comprehension level of the user, e.g., user 104*d*, is reduced. In other words, determining the first confidence level for providing assistance may be viewed as the inverse of determining a user's ability to understand speech, e.g., a high ability to understand results in a low confidence level for providing assistance, and vice versa.

In some examples, determining the first confidence level comprises determining whether an audio signature is present within the speech data and/or background noise data. Such determination may be made by comparing stored audio signatures to that of received audio data. For example, controller 103 may be configured to compare a stored audio signature with a phrase included in the speech data. In the example, shown in FIG. 1, user 104*d* may be uttering an important point, such as a navigational instruction. In this case, controller 103 may recognize a portion of the speech of user 104*d* as potentially important for the driver to be able to understand. As such, the first confidence level may increase, e.g., indicating that user 104*a* may require more assistance in understanding the navigational instruction. Additionally, or alternatively, controller 103 of vehicle 110, may compare a stored audio signature of an emergency siren with an external noise, and determine that the likelihood of the incoming audio signature being an emergency siren is above a set threshold, e.g., 80% confidence. Such comparisons may be made using any appropriate audio wave analysis techniques. In an example where an audio signature, e.g., an emergency siren, is detected, the first confidence level may increase, e.g., indicating that a user may require more assistance in comprehending the environment. For example, user 104*d* may be warning user 104*a* about an oncoming emergency vehicle.

In some examples, determining the first confidence level comprises the determination of a proximity and/or a direction of an external noise, e.g., a siren occurring outside of the car 110. Methods may be implemented to indicate the direction of a noise. Such an indication may be determined using any appropriate techniques. For example, knowing the speed of sound, the distance between the microphones, and the time difference between the time at which the sound signature was received at each microphone, the system can determine the angle of the incident sound upon vehicle 110, and therefore the approximate direction of the external noise. For example, an audio signature, e.g., a siren, may occur in a direction, e.g., behind the vehicle 110, that indicates that the driver may not be capable of seeing or hearing the oncoming vehicle, as such the first confidence level is increased. Similarly, noise triangulation methodology (or any other appropriate acoustic location technique) can be used to determine a positional relationship between users, e.g., between user 104*a* and user 104*d*.

Mathematical formulae may be used for calculating the first confidence level. Independent weights may be provided for each confidence threshold level contributing factor, wherein the weights can update dynamically, e.g., in real-time. Provided below is one such example calculation, where p(Y) is dependent on variables $a_1$ to $a_x$ and weights $b_1$ to $b_x$. In this example, variables $a_1$ to $a_x$ may represent x quantity of confidence level factor weights, and $b_1$ to $b_x$ represent x quantity of confidence level factor values.

$$p(Y)=a_1b_1+a_2b_2+\ldots a_{x-1}b_{x-1}+a_xb_x$$

At 306, control circuitry determines a second confidence level, e.g., ASR performance 118, relating to a speech recognition system's accuracy in transcribing speech data. For example, presented in FIG. 1, a speech recognition system may be any combination of processor 103, microphone 105, and processing software.

In some examples, determining the second confidence level comprises determining a value of the accuracy of the ASR system, e.g., based on a predicted word error rate of a given set of environmental parameters. In some examples, determining the second confidence level comprises determining a volume of speech data and background noise data. For example, presented in FIG. 1, if the speech data 108 were of a high volume, the accuracy of presented captions may be higher, therefore the second confidence level may increase.

The second confidence level may comprise a combined confidence score of the provision of caption data of each word, phrase, or sentence. For example, a high second confidence level may be a value of 90%, wherein it is determined that 90% of captioned sentences are correct. In other examples, the second confidence level may be based upon the transcription accuracy of individual words, for example, a transcription accuracy of 80% would indicate that 80% of transcribed words are correct.

It is known that ASR systems can associate the provision of words with a value representative of a confidence score that the word is correct. For example, a system may determine a transcription to be one of two words, wherein one word has a higher confidence score than a second, as such the higher scoring word may be generated for presentation.

Mathematical formulae may be used for calculating the transcription accuracy. In the example provided below, p(Y) represents the transcription accuracy of the system, "i" represents the quantity of words present in an audio input, e.g., a sentence, and di represents the caption accuracy confidence of each word i as discussed in the previous paragraph. In some situations, it is desirable to calculate the second confidence level using an individual accuracy of each word.

$$p(Y)=\sum_{i=1}^{i}\left(\frac{a_i}{i}\right)$$

Additionally or alternatively, determining the second confidence level comprises analyzing environmental parameters that may affect the accuracy of the second confidence level, e.g., ASR performance 118 as presented in FIG. 1. For example, if background noise 106 were of a high volume, it may be determined that the performance of the ASR, and as such the accuracy of presented captions, is expected to be lower, therefore the second confidence level may reduce. In another example, if speech data 108 were of a high volume, it may be determined that the performance of the ASR, and as such the accuracy of presented captions, is expected to be higher, therefore the second confidence level may increase. Additionally or alternatively, determining the second confidence level comprises comparing environmental parameters to previous values. For example, if background noise 106 were to increase in volume by a percentage, e.g., 10%, it may be determined that the performance of the ASR, and as such the accuracy of presented captions, is expected to decrease, therefore the second confidence level may reduce. Additionally or alternatively, determining the second confidence level comprises comparing confidence level factors. For example, the volume of speech data 108, e.g., in decibels, may be compared with the volume of background noise data 106. If it is determined that the volume of speech data 108 is significantly higher than the volume of background noise data 106, then it may be determined that the performance of the ASR should be high, therefore the second confidence level may increase.

At 308, vehicle data indicating an operational state of the vehicle may be received by control circuitry, e.g., control circuitry 218 presented in FIG. 2. Vehicle data may include telematics data, such as any of position, speed, acceleration, braking data, turning data, engine data, and/or data from advanced driver assist systems, such as a LIDAR sensor, configured to determine the condition of the environment surrounding the vehicle (e.g., other vehicles in a proximity range of the vehicle). Processing of vehicle data can determine an operational state of a vehicle such as whether the vehicle is changing lanes or is stationary. For example, in FIG. 1 processor 103 may determine, using vehicle data, that the car 110 is stationary, but with a turn signal activated and the steering wheel turned in a direction, and another vehicle approaching from that direction. Vehicle data may, for example, be processed by control circuitry 218, using any appropriate means of processing such as the processor 103 presented in FIG. 1. For the avoidance of doubt, the systems and method disclosed herein are applicable outside the automotive context, and as such receiving vehicle data may be extraneous.

At 310, the first confidence level and the second confidence level are determined to be greater or less than the respective confidence thresholds. For example, in FIG. 1, assistance 116 and ASR performance 118 are determined to be greater than respective confidence threshold 114.

A threshold factor may be any value contributing to the threshold value of at least one of the first confidence threshold or the second confidence thresholds. As such, disclosed threshold factors may include but are not limited to external and/or internal noise levels, one or more operational states of the vehicle, user activity, likelihood of cognitive overload, gaze tracking, gaze duration, etc. In some examples, threshold factors may be distinguished into being either a first confidence threshold factor or a second confidence threshold factor.

In some examples, determining the first confidence threshold, e.g., threshold 114, comprises determining an operational state (or a predicted change in the operational state), e.g. of the car 110 presented in FIG. 1. For example, a combination of vehicle data such as speed and turning rate may indicate a certain state of the vehicle, e.g., constant speed with gradual turning rate may indicate changing lanes on a highway. In some cases, providing captions to the user, e.g., driver 104*a*, during an operational state, e.g., changing lanes, may contribute to cognitive load of the driver, e.g., by adding to a number of processes that the driver is focusing on. In this example, since providing captions to the user, e.g., driver 104*a*, may contribute to cognitive load, the threshold level at which the system provides captions may be increased, thereby reducing the unnecessary or potentially dangerous provision of captions to the user while the driver's attention is needed elsewhere. In some cases, speech relating to non-critical speech (e.g., speech not relating to navigational instructions) may be filtered, e.g., using an audio signature, and a determination may be made to not generate captions for such speech, especially during periods of high cognitive load of the driver. In some cases, captions may still be generated, but their display may be delayed, e.g., to a more appropriate time, such as a time when the cognitive load of driver 104*a* is relatively low. Such an implementation may improve a safety factor, e.g., relating to when it is and when it is not safe to provide captions to a driver of a vehicle, or, indeed, captions to a user more generally.

Determining the first confidence threshold, e.g., assistance threshold 114 as presented in FIG. 1, may comprise a combination of any threshold factors, e.g., noise levels, operational states. Depending on the activity of the user, for example being parked or driving on the highway, the weight of each threshold factor's attributing value may be adjusted. For example, when it is determined that a user is in a parked vehicle, it may be determined that the importance of captioning audio signatures e.g., emergency sirens, decreases since the user is likely not obstructing an oncoming emergency vehicle. In this example the attributed weight, which may be a positive or negative weight, of external noise volume and external noise proximity in calculating the first threshold value is decreased, increasing the threshold value for provision of captions. In another example, a user may be driving on the highway, it may be determined that the importance of captioning speech data, e.g., relating to navigational instructions, is increased, hence the threshold value for presenting captions to the user may be decreased.

In some examples, the attributed weight to a threshold factor may be positive or negative. For example, activities of the user may contribute either positively or negatively to the first confidence threshold and second confidence threshold values.

In some examples, threshold 114 may comprise first and second confidence thresholds of different values for the first confidence level and the second confidence level respectively. For example, the first confidence threshold may have a first default value, set by the user or by the device. For example, the first confidence threshold may have a value of 80% by default. A first confidence threshold value of 80% represents an indication that the system requires at least an 80% probability that the user requires assistance, and, optionally, that the provision of such captions would not contribute to cognitive load. Different identified activities may have different first default threshold values. For example, when driver 104*a* is performing a maneuver, such as pulling away from a junction, the first confidence threshold may be set to a level higher than when driver 104*a* is sat idle in traffic. If the assistance level 116 of an appropriate level, e.g. above the first confidence threshold, then it has been determined that, probabilistically, that user 104*a* may benefit, e.g., by having improved safety, from the provision of captions to aid the understanding of speech that may not be clearly audible over the background noise.

In some examples, the second confidence threshold may have a second default value, set by the user or by the device. For example, the second confidence threshold may have a value of 75% by default. A second confidence threshold value of 75% indicates that the system requires the caption generation to have an accuracy of at least 75%. As such, captions may be generated once the second confidence level, e.g., ASR performance 118, is above 75%. If ASR performance level 118 is of an appropriate accuracy, e.g. above the second confidence threshold, then it has been determined that the ASR performance is at an accuracy level wherein the provision of captions to the user, e.g., user 104*a*, aids the user understand audio data, rather than hinders.

In some examples, for example if the user were engaging in the activity other than driving, e.g., running, the second confidence threshold may change. In some examples the second confidence threshold value is dependent on at least one or more second confidence threshold factors, wherein different user activities have different second confidence factor weights for each second confidence threshold factor.

The second confidence threshold may be a confidence score determined by the system to be the minimum required accuracy to ensure that the provision of captions to the user aids the user's comprehension of audio data. As such, a confidence level lower than the determined threshold, will hinder the user's comprehension, whereas a confidence level higher than the determined threshold, will aid the user's comprehension. Process 310 proceeds to process 302 if it is determined that at least one of the first confidence level or the second confidence level are less than their respective confidence thresholds.

Process 310 proceeds to process 312 if it is determined that the first confidence level and the second confidence level are greater than the respective confidence thresholds.

At 312, captions are generated for display. In the example shown in FIG. 1, a display 102 presents captions 122 of speech 108 to user 104*a*, this allows user 104*a* to process speech from user 104*d* visually, enhancing comprehension. For example, the captions may be transcription of the speech of user 104*d* "Turn right here", presented with a display icon 124 indicating to user 104*a* the user whose speech is transcribed.

FIG. 4 shows a flowchart representing an illustrative process 400 for dynamic presentation of captions.

At 402, audio data, comprising speech data and background noise data, is received, e.g., in a similar manner as described at 302, presented in FIG. 3. In the example presented in FIG. 1, a microphone 105 is used to receive the background noise and speech data. However, in some cases, the speech may be captured by a first listening device, and the background noise may be captured by a second listening device, e.g., at a different position from the first listening device. For example, the first listening device may be a microphone of a mobile device of user 104*d* and the second listening device may be a microphone of vehicle 110. In such examples, the speech and the background noise may be captured at slightly different times, e.g., depending on the distance of each listening device from a source of the speech and the background noise. As such, the speech data and the background noise data may be lacking synchronicity. In the example shown in FIG. 4, the background noise data is received at 404 and the speech data is received at 406. In some examples, background noise data may be any sound data distinct from speech data received by microphone 105. In the example presented previously, a plurality of microphones is disclosed, in the context of FIG. 1, microphones external to the car 110 may be used to enhance capture of external background noise, or may be used to enhance capture of external speech data.

At 408, the audio data is synchronized, e.g., in real time, to ensure that the background noise data and speech data have a shared unified timeline. In the example present in FIG. 1, synchronization of background noise data 106 and speech data 108 is carried out by the processor 103. In some examples, the background noise data and speech data already have a synchronized timeline as they are received at the same microphone, as such no synchronization of the audio data is required. In some examples, the noise data and speech data may each have respective timelines that are combined into a single timeline, wherein the timeline of the speech data is synchronized to the timeline of the background noise data. In some examples, background noise data and speech data comprise timestamps or tags identifying the time at which the audio capture began, and, as such, any time position during the capture can be determined with reference to the time at which capture started, e.g., its timestamp or tag. In some examples, synchronization of background noise data and speech data is performed by matching timestamps or tags of the background noise data and speech data.

At 410, audio data is processed to determine the transcription accuracy of the ASR system. In the example presented in FIG. 1, processing of the audio data is performed using the neural network model 112 using CPU 103 and/or over network 208. The neural network model 112 can be any type of model, such as a convolutional neural network described previously. Transcription accuracy is a measure of accuracy regarding transcribing speech into captions, and/or identified important sounds into captions. In the example of FIG. 1, transcription accuracy reflects how accurately the ASR system has converted the speech 108 of user 104*d* into captions 122.

At 412, user interaction data is received, wherein the user interaction data comprises: eye-tracking data of a first individual, aggregated user interaction data, activity data, and behavior patterns. Stored aggregated user interaction data may contain indications of scenarios in which data collected from user 104*a* may not be necessary. For example, a user, e.g., user 104*a*, is driving a vehicle, e.g., 110, before deciding to park. While driving, network 112 may decide to provide the user with captions, e.g., captions 122, of speech of a user in the rear of the vehicle, e.g., user 104*d*. Historic aggregated user interaction data may indicate, e.g., generally or on average, that during a parking scenario, a driver of a vehicle does not read presented captions, e.g., because the driver is focused on the environment, as such, the system determines that captions need not be generated.

At 414, control circuitry, e.g., control circuitry 218 presented in FIG. 2, receives eye-tracking data at one or more cameras, e.g., camera 107 as presented in FIG. 1. In some examples, cameras may be present in a mobile device of a user, wherein the device is communicatively coupled with system 100 or 200. In some examples, video recording devices may be cameras built into the system, e.g., cameras present within an XR headset, or in the example presented in FIG. 1, cameras of a vehicle, e.g., car 110. In some examples, eye-tracking data comprises any one of a direction of a user's gaze, a duration of a user's gaze, gaze shifts, gaze shift frequency, and gaze patterns. In some examples, eye-tracking of a user's gaze may include the direction of a user's gaze, such as glances at a specific location. In the example presented in FIG. 1, gazes are tracked by camera 107, with the user often glancing at the location of the captions 122, presented by display device 102. In the example shown in FIG. 4, 414 moves to 422, where the eye-tracking data is accessed.

At 416, control circuitry, e.g., control circuitry 218 presented in FIG. 2, receives aggregated user interaction data. In the example shown in FIG. 4, 416 moves to 424, where the aggregated user interaction data is accessed.

At 418, control circuitry, e.g., control circuitry 218 presented in FIG. 2, receives user activity data. In some examples, user activity may comprise information about the user's current activity, for example what the user is doing at a particular instance, such as performing a maneuver, adjusting a seat, etc. In the example presented in FIG. 1, the user's activity, e.g., driving on a highway, may be relevant since different activities may result in the user having a reduced or increased comprehension level, and/or different activities may require different threshold values. In other examples, away from the automotive implementation of FIG. 1, user actively may include other activities, e.g., consuming media content, attending a sporting event, exercising, or having a conversation, etc. In the example shown in FIG. 4, 418 moves to 424, where the user activity data is accessed.

At 420, control circuitry, e.g., control circuitry 218 presented in FIG. 2, determines behavior patterns. In some examples, behavior pattern data comprises indications of how the user's behavior varies or remains constant in various situations. For example, the user may require captions less often during certain activities, e.g., while driving on the highway. In some examples, behavior pattern data comprises data indicative of actions carried out by the user, for example if the user, e.g., 104*a*, is not responding to a user talking to him, e.g., user 104*d*, then this may be indicative of the user 104*a* being incapable of hearing or understanding user 104*d*. In some examples, a behavior pattern may relate to patterns in conversations between various users. For example, user 104*a* may typically benefit from assistance in understanding user 104*d*, but less so from user 104*b*. This may be because of various factors, such as a dialect of user 104*d* that user 104*a* finds difficult to understand, and/or a pattern in the seating arrangement of the users in the car. For example, user 104*b* may be an adult who typically sits in a front passenger seat and user 104*d* may be a child who typically sits in a rear passenger seat. As such, user 104*a* may, e.g., on average, benefit from a greater level of assistance in understanding the speech of user 104*d* compared to user 104*b*. In some examples, a behavior pattern may be determined based on a user schedule. For example, a behavior pattern may be that a user drives their children to school at around the same time on weekday morning, e.g., based on data accessed from a navigation system of a vehicle. As such, control circuitry may adjust a weighting of a factor influencing the determination of the first confidence level, e.g., thereby affecting the probability of whether it would be beneficial to provide captions to a user, given a context of the user's behavior. Additionally or alternatively, the first confidence threshold may be adjusted based on a behavior pattern. For example, should the user be a passenger in a taxi, e.g., determined using data from a ride hailing app, control circuitry may increase the confidence level threshold, e.g., to 95%, to substantially limit the provisions of captions to a driver of the taxi, e.g., irrespective of the driver's determined desire for captioning of the speech of the passenger. In the example shown in FIG. 4, 420 moves to 438, where data related to the determined behavior pattern(s) can be accessed.

At 422, control circuitry determines whether the first individual is looking at a display screen, e.g., display device 102 presented in FIG. 3. In some examples, video data is received at the one or more recording devices, e.g., camera 107 presented in FIG. 1. Video data is then processed, e.g., by CPU 103, to determine whether the user is looking at the display device, e.g., display device 102 presented in FIG. 1. For example, as presented in FIG. 1, the eye-tracking data indicates that the user 104*a* is looking at the display device 102, e.g., whether the user 104*a* is looking at a specific portion of display 102 configured to display captions. In the example show in FIG. 4, process 422 proceeds to 424 if it is determined that the first user 104*a* is looking at a portion of the display device 102 where user 104 would expect captions to appear. When the user 104*a* is looking elsewhere, 422 moves back to 414.

At 424, control circuitry synchronizes audio data and user interaction data, e.g., to unify a timeline for the audio data. For example, control circuitry may receive various data sets, e.g., from 416, 418 and 422, for synchronizing with the audio data. In the example shown in FIG. 4, these data sets comprise video data indicating user 104*a* is looking at a display device, e.g., a caption-displaying portion of display device 102, activity data indicating the activity of the user, e.g., the user is driving the car 110, and (previously) synchronized audio data indicating there is speech data with background noise present, e.g., user 104*a* and 104*d* are having a conversation with noise 106 occurring. By synchronizing these data sets, a unified timeline of video and audio is created to accurately reflect the user's interactions and the context in which they occur. For the avoidance of doubt, in other examples, 424 and 408 may occur concurrently and/or as part of a single processing step.

At 426, control circuitry determines a first confidence level and second confidence level, e.g., as described in process 304 and 306 presented in FIG. 3.

At 428, control circuitry determines the first confidence level. In some examples the first confidence level relates to the assisting of a user's understanding of the speech data e.g., assistance level 116 as presented in FIG. 1. For example, the noise 106 may start occurring or increase in volume, reducing the comprehension of speech by the user 104*a*. In response to this, the first confidence level 116 for providing assistance may increase, indicating that a first user, e.g., 104*a*, is struggling to understand the speech of another user, e.g., the speech 108 of user 104*d*. In some examples the confidence level is calculated partially or entirely using a neural network, e.g., neural network 112 presented in FIG. 1.

At 430, control circuitry determines the second confidence level. In some examples the second confidence level relates to the performance of the ASR system, e.g., the ASR performance level 118 presented in FIG. 1. In some examples the confidence level is calculated partially or entirely using a neural network, e.g., neural network 112 presented in FIG. 1.

At 432, vehicle data of the vehicle 110 may be received by control circuitry, e.g., control circuitry 218 presented in FIG. 2. Vehicle data may include telematics data, such as any of position, speed, acceleration, braking data, turning data, engine data, and/or any other appropriate type of data that may describe, at least partially, an operational state of a vehicle.

At 434, the vehicle data received at 432 is processed to determine an operational state (or a change in an operational state) of the vehicle, e.g. car 110 presented in FIG. 1. For example, operational states may include but are not limited to: accelerating, decelerating, stopped, travelling at constant speed, turning, travelling within a certain distance of other vehicles, a type of weather in which the vehicle is operating, etc. For example, presented in FIG. 1, vehicle data such as speed and steering angle may indicate that car 110 is stationary. Vehicle data may for example be processed by, for example, neural network 112 and/or via network 208 and circuitry 218. Upon determining the vehicle's operational state, e.g., as a sustained state or a changing state over a predetermined period, such as 5 seconds or 1 minute, 434 moves to 440.

At 440, control circuitry sets a first confidence threshold, e.g., based on the operational state of the vehicle. For example, control circuitry 218 may set the first confidence threshold at a relatively low level (50% confidence), when vehicle 110 is operating or being operated in a steady-state environment, such as stationary in traffic or driving on highway. As such, system 100 may more freely provide captions to a user. Conversely, control circuitry 218 may set the first confidence threshold at a relatively high level (95% confidence), when vehicle 110 is operating or being operated in a changing-state environment, such as urban driving in congested areas, and/or in situations where a cognitive load of a driver is higher than other times. As such, system 100 may less freely provide captions to a user, thereby improving a safety factor relating to the dynamic generation of captions. In some examples, the first confidence threshold is set or reset to reflect updated first confidence threshold of process 438, as discussed below.

At 442, control circuitry sets a second confidence threshold. For example, control circuitry 218 may set the second confidence threshold at a level based on the operational state of the vehicle 110. In some cases, the second confidence threshold may be set to a relatively high level, e.g., 90%, when the vehicle 110 is operating or being operated in a changing-state environment. In this manner, the accuracy of the dynamic captions is held at a higher level during periods of higher cognitive load of user 104*a* and not as freely provided, ensuring that user 104*a* does not use an unnecessary level of concentration when determining the meaning of the captions. Conversely, the second confidence threshold may be set to a relatively low level, e.g., 30%, when the vehicle 110 is operating or being operated in a steady-state environment. In this manner, the accuracy of the dynamic captions is held at a lower level during periods of lower cognitive load of user 104*a* and are more freely provided, allowing the user to receive a higher amount of information for them to process, e.g., when the operational context of the vehicle 110 (or indeed the environment as a whole) is deemed to be safer. In some examples, the second confidence threshold is set or reset to reflect the updated second confidence threshold of process 438.

At 444, the first confidence level and the second confidence level are determined to be greater or less than the respective confidence thresholds. Upon determining the first confidence level and second confidence level to be greater than the respective confidence thresholds, process 444 proceeds to process 456. Otherwise, 444 returns to 426.

At 450, captions and a speech position indication are generated at 452 and 450 respectively. For example, captions are generated for display when it has been determined that the first confidence level is above the first confidence threshold. In some examples, this indicates that the user has indicated implicitly and/or explicitly that the provision of captions is required to enhance comprehension. In some examples, this indicates that the provision of captions to the user will not contribute to a cognitive load of the user, e.g., user 104*a*. Further, the captions are generated when it has been determined that the second confidence level is above the second confidence threshold, e.g., in addition to the first confidence level being above the first confidence threshold. In some examples, this indicates that captions provided are of a sufficient accuracy to aid the user's comprehension of audio, e.g., speech 108 from user 104*d*.

At 445, control circuitry, e.g., control circuitry 218 presented in FIG. 2, receives data usable to determine a position of a user. For example, data may comprise video data from one or more cameras, e.g., camera 107 presented in FIG. 1, data from an occupancy sensor of vehicle 110, data from a mobile device associated with a user (e.g., in communication with vehicle controller 103).

At 446, control circuitry, e.g., control circuitry 218 accesses the data received at 445 to determine a position of a user. In the example shown in FIG. 1, controller 103 determines that the rear, nearside seat is occupied by user 104*d*. For example, video data and occupancy data used in conjunction may indicate the position of a second individual within the vehicle, e.g., user 104*d* within car 110. Although not shown in FIG. 1, video data may comprise data from additional cameras both within and external to the vehicle. Although not shown in FIG. 1, video data may be used to identify the location of a passenger, wherein the video data can be a reflection in a reflective surface, e.g., wing mirrors, and rear-view cameras.

At 448 it is determined whether the speech data, e.g., speech 108 presented in FIG. 1, is associated with the position of a second individual, determined in process 446. Methods of determination of association may for example include, but are not limited to: body language, mouth and lip movement, gaze direction, gaze duration, user location, sound direction, and sound volume. For example, presented in FIG. 1, the user 104*d* is speaking to user 104*a*, video data may indicate that user 104*d* has his body and head facing towards user 104*a*, his lips may be moving indicating that user 104*d* is engaged in conversation, and his gaze may be directed towards user 104*a*, either directly or by a reflective medium such as a rear-view mirror. The direction of the speech data may be determined using any appropriate technique. For example, in using at least one microphone, knowing the speed of sound, the distance between the microphones, and the time difference between the received sound of the first microphone and the second microphone, the direction of the incident sound can be determined. Upon determination that the speech data is associated with the position indicated in process 446 of the individual, e.g., user 104*d*, then 448 proceeds to 454.

At 454, an indication of the position of a second individual, e.g., user 104*d*, is generated for display along with captions at 452. In some examples this may be a direction indication, e.g., an arrow on a display device. In other examples this may be an indication by any other means of the location of the individual, e.g., a number denoting the seat the user is occupying, e.g., 124 as presented in FIG. 1. In some examples, this may be the highlighting of a graphic displaying the seats present within the vehicle, and/or by virtue of displaying an avatar representing the person who is speaking. In some examples, the indication of position may update as the captions change. For example, should user 104*c* begin speaking instead of user 104*d*, captions for the speech of user 104*c* may be generated and position indicator 124 may update to reflect that a different person is speaking. In some examples, the determination of whether to generate a direction indication of a second user, may comprise processing of data, e.g., speech data, background noise data etc. In some examples, an increased volume of speech data and/or background noise data may contribute to the decision making to generate captions.

At 456, feedback is received and provided as input to process 438. In some examples feedback can be explicit, for example, the system may prompt the user with questions regarding the provision of captions, e.g., "Was this caption helpful?", with the response taken as explicit feedback from the user. In some cases, implicit feedback may be taken from a determination of whether the user 104*a* looked at the generated captions, e.g., based on eye-tracking data received at 414. For example, a user may not look at generated captions should that user not need assistance at that time. Alternatively, a user may glance at a portion of the display 102 where captions are normally generated, expecting captions, but finding no captions are presented. Such implicit feedback may be used to update the first and/or second confidence thresholds to affect the conditions under which the captions are generated.

Additionally or alternately, the first and second confidence thresholds may be updated based on the presence of an audio signature in the speech data and the background noise data. For example, at 436, it is determined whether the speech data and background noise data comprise an audio signature. In FIG. 1, background noise 106 may be an external noise, e.g., a siren or construction noise. An audio signature of speech data may be a particular phrase, such as "Hey Dad—Are we there yet!". For example, the sound of the siren, may cause the first confidence threshold to increase to limit the provision of captions, such that user 104*a* is not distracted by the captions in a potential emergency situation. In another example, the sound of construction noise may cause the first confidence threshold to decrease to allow the provision of captions under a wider set of conditions, e.g., when it is more likely that user 104*a* needs assistance in understanding speech. Any manner of comparing digital information may be implemented, for example, by the control circuitry 218 presented in FIG. 2 to determine the presence of an audio signature. For example, a user profile may contain a list of words, phrases and sounds that indicate an audio signature specific to a user. Upon determination that an audio signature is present within the speech data and/or the background noise data 436 moves to 438, or otherwise returns to 402.

At 438, control circuitry provides instructions to update the first confidence threshold and the second confidence threshold, e.g., based on the feedback data received at 456 and/or the presence of an audio signature. For example, control circuitry may store, in a data structure, values for the confidence thresholds set at 440 and 442. In response to receiving the feedback and/or determining the presence of an audio signature, one or more values in the data structure may be updated. In some examples, these data structures may be used as training data for neural network 112 and/or for data contributing to the aggregated user interaction data.

The actions or descriptions of FIG. 4 may be used with any other example of this disclosure, e.g., the example described below in relation to FIGS. 5 to 10. In addition, the actions and descriptions described in relation to FIG. 4 may be done in any suitable alternative orders or in parallel to further the purposes of this disclosure.

The example shown in FIG. 5 illustrates a user 502 watching a display 504, e.g., a TV or monitor, the display having a controller 506, e.g., an electronic control unit (ECU) of the display device, configured to communicate operatively with one or more display systems. In addition, system 500 comprises a microphone 506 configured to receive sound from one or more sound sources in the proximity of the display. In the example shown in FIG. 5, the display 504 is a TV positioned in room, and the sound source 518 is a dog 516 barking at the user 502. In some examples, the microphone 506 is a room component, e.g., a microphone built into another device in the room, or as a standalone device, or part of an array of microphones positioned around the display. Additionally or alternatively, microphone 506 may be a component of a user device, such as a smartphone, or part of an extension device of the display 504, e.g., a remote control. In some examples, system 500 may comprise a set of microphones distributed across devices. For example, system 500 may comprise a first microphone of a vehicle and a second microphone of a mobile device or extension device. In some case, the microphone is configured to capture a sound output that accompanies media content displayed on device 504.

System 500 comprises a camera 508 configured to capture images of the environment in which the display 504 is located. In some examples, the camera 508 is a room component, e.g., a camera built into another device in the room, or as a standalone device, or part of an array of cameras positioned around the display. Additionally or alternatively, camera 508 may be a component of a user device, such as a smart phone, or part of an extension device of the display 504, e.g., a remote control. In some examples, system 500 may comprise a set of cameras distributed across devices. For example, system 500 may comprise a first camera of a TV and a second camera of a mobile device or extension device. In some examples, video recorded by the camera is a reflected image from a reflective surface, for example a mirror.

Although not shown, system 500 comprises control circuitry configured to receive and process audio data and video data, e.g., via network 208. In FIG. 5, such control circuitry is configured to receive and process audio data and video data captured at microphone 506 and camera 508 respectively, and output one or more control signals for generating captions on display 504.

In FIG. 5, a user 502 is consuming (or attempting to consume) an F1 race on display 504. While consuming the race 512, a background noise, e.g., dog 516 barking in the room, is occurring or has increased in volume. As a result, user 502 struggles to hear the race 512. In some cases, this may lead to reduced comprehension by user 502 of a speech component of the media content item 512. For example, although not presented in FIG. 1, user 502 may not hear, or mishear, commentary, e.g., commentary exclaiming “And through goes Hamilton!”, of the F1 race 512. It is therefore to the advantage of the user for the display 504 to present captions 514 for the user’s consumption, this allows user 502 to continue to consume media content 512 without interruption, and/or may reduce computational operation associated with user 502 requesting a reply of the media content. In some examples, the system may determine whether a user, e.g., user 502, is struggling to comprehend the media by analyzing his behavior patterns. For example, if the user 502 repeatedly rewinds and rewatches a scene, it may be an indication that he is struggling to hear the scene, this may therefore impact the first confidence level, e.g., assistance 116 presented in FIG. 1. In other examples, if the user, e.g., user 502, repeatedly glances at a position where captions are often provided, e.g., 514, this may be an indication that he is struggling to hear the media content item, e.g., 512. In other examples, if the user, e.g., user 502, increases the volume, e.g., of media content 512, this may be an indication that he is struggling to understand speech of the media content. In other examples, other behavior patterns of the user may be used as an indication to the user’s ability or capacity to comprehend a media item.

FIG. 6 shows a sequence diagram of illustrative steps for enabling the dynamic presentation of captions, in accordance with some embodiments of the disclosure. Process 600 may be implemented, in whole or in part, on any of the computing devices mentioned herein. In addition, one or more actions of the process 600 may be incorporated into or combined with one or more actions of any other processes, embodiments or examples described herein.

The process 600 comprises a user 602, an eye-tracking device 604, e.g., a Head-Mounted Display (HMD), a microphone array 606, an Automatic Speech Recognition (ASR) engine 608, and a Context-Adaptive Processing Unit (CAPU) 610.

At 612, the user 602 looks at a content item presented on a display device, e.g., an F1 race 512 displayed on display 504 as presented in FIG. 5. As such, video data is received at the eye-tracking device, e.g., camera 508. At 614, speech data and background noise data are received at the microphone array, e.g., microphone 506. At 616, the extracted eye-tracking data of the video data is sent to the CAPU, in some examples the CAPU may be present on and/or processed by processor 506. At 618, captured audio, e.g., from microphone 506 is sent to the ASR engine, in some examples the ASR engine may be present on and/or processed by processor 506. At 620, the results of the ASR engine are sent to the CAPU, in some examples the results of the ASR engine are in text form. At 622, the decision to either display or hide captions, e.g., captions 514, is received from the CAPU. At 624, relevant behavior data is used to update the behavior model of the CAPU. As such, at 622 in the situation presented by FIG. 5, it has been determined that the user is struggling to comprehend commentary on the F1 race 512, as such captions are presented to the user 502 in the form of the missed commentary, e.g., caption data 514 reading “And through goes Hamilton!”.

System 700 comprises control circuitry of a Head Mounted Display (HMD) 704 configured to receive and process audio data and video data, e.g., in cooperation with system 200. In FIG. 7, such control circuitry is configured to receive and process audio data and video data captured from microphones and cameras of the HMD 704. The control circuitry is configured to generate one or more control signals for generating captions 710 on display 704.

In FIG. 7, a user 706 is communicating (or attempting to communicate) with a user 702 wearing display 704. User 702 and user 706 are discussing an F1 race that they are attending. While communicating, a noise in the background 714 occurs or increases in volume, e.g., a vehicle 712 passing by. As a result, user 702 struggles to hear the speech 708 of user 706. In some cases, this may lead to reduced comprehension by user 702 of the speech of user 706. For example, user 702 may not hear, or may mishear, the user 706. In this example, user 704 cannot hear user 706 say: "Wow that was fast!". It is therefore to the advantage of the user 702 for the device 704 to present captions 710 for the user's consumption, this allows the user 702 to read caption data of the speech of user 706 as opposed to attempting to hear over the external noise 714.

In some examples, a user 706 is communicating with user 702 in a different language, e.g., in French when user 702 is primarily an English speaker. If user 702 were capable of speaking French but not fluently, e.g., user 702 is currently learning French, user 702 may often need subtitles for more complex words, but not for simple language. For example, if user 706 were discussing medical terms with user 702, complex language may be necessary, e.g., disease and treatment names. In some examples, the system can translate any recognized language, and adapt to the user's competency level. For example, during a conversation regarding the weather, user 702 may not need help with any words, hence she will not frequently look for subtitles, e.g., subtitles in position 710. However, in a conversation discussing a more complex topic, she may frequently glance at the position of the subtitles, hence it may be deemed that she requires captions of translations to be generated for more complex language.

In some examples, user 702 is learning to speak French, whereas user 706 is a proficient French speaker. User 706 may speak French at a faster rate than user 702 is capable of understanding. As such, the rate at which a user, e.g., user 706, is speaking, may contribute to whether the system deems a user requires captions of translations to be generated. In some examples, a language proficiency level may be an indication as to the proficiency of a user in speaking and/or understanding a language. Language proficiency levels may be specific to different languages. In some examples, data regarding a user's language proficiency level may be stored in a user profile and/or determined (e.g., in real time) using implicit and/or explicit feedback from the user. For example, a user may often request another user speaking in a different language (or in a same language to a higher proficiency) to repeat themselves, therefore indicating a lower language proficiency level for that language. For example, user 702 may be a native speaker of English, competent in French, and learning German, as such the user may have different language proficiency levels for each of these languages. As such, system 700 may provide captions of spoken German most often, captions of French less often, and captions of English least often. As such, the confidence level, e.g., assistance 116 presented in FIG. 1, may be impacted by the identified language a user is speaking, and the associated user's, e.g., user 104*a*'s, associated language proficiency level. For example, a language proficiency level of a user, e.g., access at a user profile, may be used as a parameter when determining the confidence level.

In some examples, the system may be capable of recognizing when a user, e.g., user 702, has requested another user to repeat themselves, thereby indicating that user 702 is struggling to comprehend another user. For example, if users 702 and 706 were discussing a complex topic such as medical practice, and user 706 repeatedly discuss treatments and disease names which user 702 is not familiar with, user 702 may often ask user 706 to repeat herself. As such, the system may identify words and phrases the user is particularly struggling with and update the network model settings and weights as necessary.

In some examples, the system can use spoken language as an implicit command to provide captions, for example, if user 702 often says "pardon" when conversing with user 706, the system may identify "pardon" as an implicit command to provide captions.

In some examples, the system may attribute weights and network preference values to words and phrases partially or entirely based on their definition. For example, when conversing in a second language, if user 702 often struggles to comprehend another user 706 with respect to certain types of words or phrases, the system may identify common attributes to words that the user 702 struggles with. For example, if the words that user 702 seems to struggle with are medical terms and phrases, then the system may identify a preference for medical terms to be captioned and presented to the user 702. For the avoidance of doubt, the features of FIG. 7, as described above, may be implemented, where technically appropriate in the examples of FIG. 1. For example, user 104*d* may be speaking in a language at a first proficiency level, and user 104*a* understands that language at a second proficiency level, the second proficiency level being lower than the first proficiency level.

The process 800 comprises a user 802, a Head-Mounted Device (HMD) 804, e.g., eye-tracking device, a microphone array 806, an Automatic Speech Recognition (ASR) system, a Context-Adaptive Processing Unit (CAPU) 810, and a storage 812 for user preferences and feedback.

At 814, calibration is performed, for example using gaze tracking of the system. In some examples, gaze-tracking may comprise values indicating one or more positions on the display, e.g., 704, at which the user is looking, and calibration may be performed through the analysis of where the user is looking, and therefore the position at which the user is, or is indicated to be, looking. Any appropriate method of calibration may be used, for example the HMD, e.g., 704, may request the user 802 to look at an indicated position on the display. This step may be performed during the initial setup of the device. At 816 the user's initial preferences are sent to the CAPU. This step may be performed during the initial setup of the device, e.g., 706. At 818, baseline data from the CAPU may be input back into the CAPU. This step may be performed during the initial setup of the device, e.g., device 706.

At 820, eye movements and gaze patterns, e.g., of user 802, are received and captured by the HMD, e.g., device 704. At 822, speech and background noise are received at the microphone array, e.g., the microphone present within HMD 704. At 824, eye-tracking data captured by the eye-tracking device is sent to the CAPU. At 826, audio data, e.g., the speech data and background noise data, is sent to the ASR engine. At 828, the results of the ASR engine are sent to the CAPU, in some examples, the results of the ASR engine are in text form. At 830, the CAPU analyzes at least one of the ASR results and eye-tracking data in order to analyze the context of the user 802. At 832, the decision to display or hide captions, e.g., captions 710, is received at the HMD 704.

At 832, in the example presented in FIG. 7, it has been determined by the CAPU that captions should be displayed to the user 702. As such, captions displaying “Wow that was fast” 710 are presented to the user 702.

At 834, criteria and thresholds determined from processing within the CAPU is reentered into the CAPU. At 836, thresholds, e.g., thresholds described earlier in FIG. 3 and FIG. 4, are updated based on feedback. In some examples, feedback can be any one of implicit or explicit feedback from the user. In some examples, feedback used in process 836 comprises the feedback received at process 840 from the user 802. At 838, the presentation of captions is adjusted based upon the decision output from the CAPU.

At 840, implicit and explicit feedback is received by the HMD 804 e.g. 704, from the user 802. At 842, feedback data is sent to the CAPU. At 844, the feedback is stored and processed at the user preferences and feedback storage device 812. At 846, the model of the CAPU is refined and thresholds of the CAPU are adapted. In some examples, this refinement and adaption is based upon the feedback previously received at 840 and processed and stored at process 844.

At 848, the user 802 views captions, e.g., captions 710 displayed on device 704 as presented by FIG. 7. In some examples, the transparency and/or location of presented captions may be adjusted to prevent the obstruction of objects from the user. In some examples the adjustment of the transparency and/or location of presented captions may be based on implicit and/or explicit feedback received from the user 802, e.g., captions may be moved to prevent the obstruction of an identified object such as a car. At 850, the interactions of user 802 are sent to the CAPU. In some examples, the interactions may include options of manual overrides related to the presentation/presentation of captions and/or setting changes of the device. At 852, decisions pertaining to the adjustment of the captions are acted upon by the HMD. For example, settings may adjust the size of subtitles, the location, the frequency, etc.

As discussed in process 848, the transparency and/or location of generated captions may be adjusted to prevent the obstruction of objects in the field of view of the user. In some examples, video data is received at a camera, which in some examples may be the same camera used in the eye-tracking of a user, e.g., camera 107 presented in FIG. 1. Upon receiving the video data, control circuitry may implement methods of object identification to identify objects within the field of view of the user. For example, whilst crossing the road captions may be presented obscuring an oncoming vehicle, upon the detection and identification of the vehicle, the system may look to reduce the size of, increase the transparency of, or move the captions to prevent visual obstruction of an object.

FIG. 9 illustrates process 900 involving a user 902, a Head-Mounted Device (HMD) 904, e.g., eye-tracking device, a microphone array 906, an Automatic Speech Recognition (ASR) engine 908, a Context-Adaptive Processing Unit (CAPU) 910, and a storage device capable of storing training data 912.

Processes 914 to 950 relate to stages of creating a network, e.g., network 112 presented in FIG. 1. These stages are as follows: initial data collection, data preprocessing, initial model training, iterative model refinement, and continuous learning and adaptation.

Processes 914 to 926 relate to initial data collection. At 914, eye-tracking data is received at the HMD, in some examples, the data may comprise gaze pattern data of the user 902. At 916, speech data and background noise data are received at the microphone array 906, e.g., speech data of speech 108 and background noise data of background noise 106 as presented in FIG. 1. At 918, the eye-tracking received at the HMD in process 914 is sent to the CAPU. At 920, the audio data comprising speech data and background noise data received at the microphone array during process 916, is sent to the ASR Engine. At 922, the ASR results are sent to the CAPU. In some examples, the ASR results are comprised of text. At 924, the user 902 provides feedback, which is sent to the CAPU. In some examples, feedback is comprised of any of explicit and implicit feedback. At 926 data is stored in the storage device 912.

Processes 928 and 930 relate to data preprocessing. At 928, data is synchronized into a unified timeline to accurately reflect the user’s interactions and the context in which they occur. In some examples the data is synchronized using timestamp mapping similar to the methods previously discussed in at 408 of process 400. Upon the generation of video and audio data, techniques are known to identify a start timestamp, and therefore the timestamp of any subsequent position in time of the data. Consequently, the synchronization may be processed using the comparison of timestamps of video and audio data. For example, if video data and audio data both have at least one identical timestamp, then upon synchronizing the video data and audio data at this timestamp, all previous and subsequent timestamps will also be synchronized. At 930, features are extracted from data. In some examples, extracted features may include gaze duration, noise levels, noise proximity, noise direction, etc.

Processes 932 to 938 relate to initial model training. At 932, labeled training data is received at the CAPU from the storage device 912. At 934, the network model, e.g., network 112, is trained using supervised learning with the labeled training data received at process 932 (check this is correct). At 936, the neural network, e.g., network 112, is implemented for prediction, e.g., for the generation of the first confidence level and the second confidence level (check). At 938, thresholds are determined for subtitle activation. In some examples, the thresholds comprise a first confidence threshold and a second confidence thresholds. In some examples, the thresholds have a predetermined default value, e.g., 80%. This value may be dependent on threshold factors, e.g., operational state of a vehicle, audio proximity (check threshold definitions earlier in application).

Processes 940 to 944 relate to iterative model refinement. At process 940, the network model, e.g. network 112 presented in FIG. 1, is continuously (should this word be avoided) updated with new data. At process 942, thresholds are updated dependent on ongoing data. For example the first confidence threshold, e.g., assistance 116 presented in FIG. 1, may increase because background noise, e.g., noise 106, has increased in volume. At process 944, if applicable, aggregated user data (e.g., cross-user data or multiple user data) is stored in storage device 912.

Processes 946 to 950 relate to continuous learning and adaptation. At process 946 real-time data is fed into the model in the form of a feedback loop, allowing for the immediate adjustment of model weights in real-time. At process 948, behavioral patterns may be recognized by the model, as such, the levels and thresholds, e.g., first and second confidence levels, and first and second confidence thresholds, or weight of factors influencing the value of levels and thresholds, e.g., confidence level factors and confidence threshold factors, may be adjusted in real-time to account for user behavior patterns. At process 950, profile-based learning for context-specific adaptations is processed, in some examples this may include the adjustment and subsequent updating of user profile settings and/or factor weights relevant to the user or scenario the user is in.

The process 1000 comprises user 1002, deep learning model 1004, and data comprising gaze data 1006, audio data 1008, activity data 1010, and context data 1012. In some examples, gaze data 1006 may comprise eye-tracking metrics such as gaze direction, fixation duration, saccades, etc. In some examples, audio data 1008 may comprise processed audio signals from the microphone array, for example speech data and/or background noise data, user identification, and speech transcriptions from the ASR engine. In some examples activity data 1010 may comprise information about the user's current activity, activities may include walking, sitting, driving on the highway, parking a vehicle, obtained from sensors of the HMD, system cameras, or any connected devices. In some examples, context data may comprise data of the environment, such as lighting conditions, detected through sensors, cameras, or derived from audio input.

Deep learning model 1004 comprises input layer 1014 which receives gaze data 1006, audio data 1008, activity data 1010, and context data 1012. The output of input layer 1014 forms the input to the feature extraction layer 1016. The feature extraction layer comprises any quantity of Convolutional Neural Network (CNN) layers 1018 and Recurrent Neural Network (RNN) layers 1020. In some examples, CNN layer 1018 is applied to spatial data, e.g., gaze patterns, gaze direction, fixation duration, special audio features etc. In some examples, RNN layer 1020 is applied to capture temporal dependencies in sequential data, e.g., gaze shifts over time, changes in ambient noise levels, and other trends and dependencies. In some examples the RNN may be a Long Short-Term Memory (LSTM) network. In some examples the feature extraction layer 1016 comprises an attention mechanism not presented in FIG. 10. The attention mechanism may focus on the most relevant factors of the input data, e.g., prolonged gazes or sudden changes in audio data, as these factors are more likely to necessitate an adjustment in caption presentation to the user.

Fusion layer 1022 performs multi-modal fusion to combine the outputs of the CNN and RNN layers to ensure that the model considers both spatial and temporal aspects of the input data in the decision-making process. The fusion layer 1022 may also comprise contextual embeddings that represent different user profiles or scenarios, this allows the model to adapt to specific contexts. For example a user working in an office with low background noise may need the presentation of captions less often, whereas if during subway travel the user often communicates in a loud environment, then captions may need to be presented more often.

Decision layer 1024 processes the output of fusion layer 1022. In some examples the decision layer 1024 comprises fully connected layers that in combination may generate the first confidence level and the second confidence level, e.g., assistance 116 and ASR performance 118 as presented in FIG. 1. As discussed previously, thresholds have been determined, e.g., first confidence threshold may have a default value of 80%, and determination is made whether the first confidence level and second confidence level are greater than their respective thresholds, e.g., first confidence threshold and second confidence threshold.

Output layer 1026 processes the output of decision layer 1024. The output from the output layer 1026 may comprise a binary output 1028, wherein an output of "1" may indicate that captions should be displayed, and an output of "0" may indicate that captions should not be displayed. In some examples, binary output 1028 is received at control circuitry, e.g., control circuitry 210 presented in FIG. 2, wherein captions are then generated, e.g., upon receival of a "1", or not generated, e.g., upon receival of a "0". In some examples the output of output layer 1026 comprises a confidence score 1030. This may be received by control circuitry, e.g., control circuitry 210, alongside binary output 1028 and used in order to adjust the transparency of presented captions.

Deep learning model 1004 may require a training process 1032. In some examples, training process 1032 may receive real data 1034 and synthetic data 1036. In some examples, synthetic data 1036 is processed by data augmentation 1038 to result in augmented synthetic data. Augmented synthetic data may increase/vary the data pool for training the model, e.g., deep learning model 1004. Augmented synthetic data may comprise for example with a range of levels of noise, gaze patterns, environmental contexts, etc. The inclusion of augmented synthetic data may provide the model with training data otherwise not present in the real data 1034.

Labeled training data 1040 may comprise real data 1034 and augmented synthetic data examples, labeled with whether captions were needed or not, e.g., a high first confidence level indicative of the need to present captions to a user would be labeled as such. Model training 1042 may comprise processing the labeled training data 1040, e.g., to recognize and learn patterns based on labeled data.

As part of model training 1042, cross-entropy loss 1044 may be used. A cross-entropy loss 1044 function measures the difference between the predicted probability distribution and the actual labels, e.g., the variation between when the model predicted the user required captions, and when the user actually required the captions. In some examples, regularization techniques, e.g., L2 regularization, are employed to prevent overfitting of the model to the training data, this may increase accuracy between training and validation data during model testing, and therefore increase the accuracy of the model once implemented.

In some examples, optimizing of the model comprises gradient descent optimization. The model, e.g., deep learning model 1004, uses stochastic gradient descent (SGD) with momentum to optimize the weights of the model. In some examples, early stopping may be employed, halting training if the model's performance of the validation set does not improve after a certain number of epochs.

Model weight update 1046 is processed in order to update the weights of the model after optimization is complete.

As part of continuous training 1048 of the model, online learning 1050 and model retraining 1052 are implemented. In the case of online learning 1050, the model continues to learn from new data in real-time, model weights are then periodically updated based on the latest user interactions and feedback. In the case of model retraining 1052, the model undergoes periodic retraining with the latest collected data to refine its predictions. This includes adjusting the thresholds and improving the accuracy of the confidence scores.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for dynamic caption presentation on a display unit of a vehicle, the method comprising:
receiving, using control circuitry, speech data and background noise data at one or more microphones associated with a vehicle;
receiving, using control circuitry, user interaction data indicating a first confidence level relating to assisting in a user's understanding the speech data, wherein the user interaction data comprises eye-tracking data indicating one or more portions of the display unit at which the user is looking, the display unit being configured to display captions;
determining, using control circuitry, a second confidence level relating to a speech recognition system being able to accurately transcribe the speech data by separating it from the background noise data;
receiving, using control circuitry, vehicle data indicating an operational state of the vehicle;
determining, using control circuitry, that the first confidence level and the second confidence level are greater than respective first and second confidence thresholds, wherein the first confidence threshold is based on the operational state of the vehicle; and
generating, using control circuitry, the captions for display on the display unit when the first confidence level and the second confidence level are greater than the respective confidence thresholds.

2. The method of claim 1, wherein:
the vehicle data includes at least one of location data, navigational data, speed data, acceleration data, braking data, steering data, communication data and powertrain data; and
the method further comprises:
determining the operational state of the vehicle based on one or more changes in the vehicle data.

3. The method of claim 1, the method further comprising:
determining a position of a passenger in the vehicle;
determining that the speech data is associated with the position of passenger; and
generating an indication of the position of the passenger when generating the captions for display.

4. The method of claim 1, wherein:
the user interaction data comprises user activity data; and
the method further comprises:
determining the first confidence level based on the user activity data.

5. The method of claim 1, the method further comprising:
synchronizing the user interaction data to the speech data and the background noise data.

6. The method of claim 1, the method further comprising:
receiving feedback data relating to the generated captions; and
updating at least one of the first and second confidence thresholds based on the feedback data.

7. The method of claim 1, wherein the user interaction data is aggregated from multiple users.

8. The method of claim 1, wherein:
the user interaction data comprises user behavior patterns; and
the method further comprises:
updating the first and second confidence thresholds based on the user behavior patterns.

9. The method of claim 1, the method further comprising:
determining that at least one of the speech data or the background noise data comprises an audio signature; and
causing an adjustment to the first confidence threshold based on the background noise data comprising the audio signature.

10. The method of claim 1, the method further comprising:
training a network using the speech data, the background noise data and the user interaction data; and
using the trained network to output the first and second confidence levels to cause the captions to be generated for display.

11. A system for dynamic caption presentation on a display unit of a vehicle, the system comprising:
control circuitry configured to:
receive, via Input/Output circuitry, speech data and background noise data at one or more microphones associated with a vehicle;
receive, via the Input/Output circuitry, user interaction data indicating a first confidence level relating to assisting in a user's understanding the speech data, wherein the user interaction data comprises eye-tracking data indicating one or more portions of the display unit at which the user is looking, the display unit being configured to display captions;
determine a second confidence level relating to a speech recognition system being able to accurately transcribe the speech data by separating it from the background noise data;
receive, via the Input/Output circuitry, vehicle data indicating an operational state of the vehicle;
determine that the first confidence level and the second confidence level are greater than respective first and second confidence thresholds, wherein the first confidence threshold is based on the operational state of the vehicle; and
generate the captions for display on the display unit when the first confidence level and the second confidence level are greater than the respective confidence thresholds.

12. The system of claim 11, wherein:
the vehicle data includes at least one of location data, navigational data, speed data, acceleration data, braking data, steering data, communication data and powertrain data; and
the control circuitry is further configured to:
determine the operational state of the vehicle based on one or more changes in the vehicle data.

13. The system of claim 11, wherein the control circuitry is further configured to:
determine a position of a passenger in the vehicle;
determine that the speech data is associated with the position of passenger; and
generate an indication of the position of the passenger when generating the captions for display.

14. The system of claim 11, wherein:

the user interaction data comprises user activity data; and the control circuitry is further configured to:

determine the first confidence level based on the user activity data.

15. The system of claim 11, wherein the control circuitry is further configured to:

synchronize the user interaction data to the speech data and the background noise data.

16. The system of claim 11, wherein the control circuitry is further configured to:

receive feedback data relating to the generated captions; and update at least one of the first and second confidence thresholds based on the feedback data.

17. The system of claim 11, wherein the user interaction data is aggregated from multiple users.

18. The system of claim 11, wherein:

the user interaction data comprises user behavior patterns; and the control circuitry is further configured to:

update the first and second confidence thresholds based on the user behavior patterns.

19. The system of claim 11, wherein the control circuitry is further configured to:

determine that at least one of the speech data or the background noise data comprises an audio signature; and cause an adjustment to the first confidence threshold based on the background noise data comprising the audio signature.

20. The system of claim 11, wherein the control circuitry is further configured to:

train a network using the speech data, the background noise data and the user interaction data; and use the trained network to output the first and second confidence levels to cause the captions to be generated for display.

* * * * *